U.S. Patent No.: US 9,730,278 B2
Date of Patent: Aug. 8, 2017

(12) United States Patent
Suzuki et al.

(54) INDUCTION HEATING COOKING DEVICE

(71) Applicant: Panasonic Intellectual Property Management Co., Ltd., Osaka-shi, Osaka (JP)

(72) Inventors: Hidekazu Suzuki, Hyogo (JP); Tomoya Takahashi, Hyogo (JP); Kenji Ogawa, Hyogo (JP); Hiroshi Isago, Hyogo (JP); Shumpei Ando, Hyogo (JP); Masahiro Yokono, Hyogo (JP); Ryuuji Nagata, Hyogo (JP); Katsuyuki Aihara, Hyogo (JP); Shozo Ushio, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 126 days.

(21) Appl. No.: 14/408,224

(22) PCT Filed: Mar. 10, 2014

(86) PCT No.: PCT/JP2014/001342
§ 371 (c)(1),
(2) Date: Dec. 15, 2014

(87) PCT Pub. No.: WO2014/156010
PCT Pub. Date: Oct. 2, 2014

(65) Prior Publication Data
US 2015/0114953 A1    Apr. 30, 2015

(30) Foreign Application Priority Data

Mar. 28, 2013 (JP) ................................. 2013-068098
Jul. 31, 2013 (JP) ................................. 2013-158595

(51) Int. Cl.
*H05B 6/12* (2006.01)
*H05B 6/36* (2006.01)
(Continued)

(52) U.S. Cl.
CPC ............. *H05B 6/1209* (2013.01); *H05B 6/02* (2013.01); *H05B 6/062* (2013.01); *H05B 2206/022* (2013.01)

(58) Field of Classification Search
CPC ...... H05B 6/1209; H05B 6/062; H05B 6/362; H05B 6/02; H05B 2206/022; H05B 6/12;
(Continued)

(56) References Cited

U.S. PATENT DOCUMENTS 6,410,892 B1    6/2002  Peschl et al.
2005/0274717 A1  12/2005  Kataoka et al.
(Continued)

FOREIGN PATENT DOCUMENTS

CN    1672466 A    9/2005
CN    102077685 A    5/2011
(Continued)

OTHER PUBLICATIONS

JP 2012 243602 A Machine Translation; Kusaka Takaaki, Okada Kazuichi, Katsube Hiroyuki; Induction Heating Cooker; Oct. 12, 2012.*
(Continued)

*Primary Examiner* — Quang D Thanh
*Assistant Examiner* — Hemant Mathew
(74) *Attorney, Agent, or Firm* — Brinks Gilson & Lione

(57) ABSTRACT

In order to provide an induction heating cooking device in which a supporting configuration of a heating coil unit is simple and can be easily assembled, and which can accurately and constantly maintain a distance between a top plate and heating coils, opposite side surfaces of a framework laid out below the top plate are configured to have first vertical parts, first horizontal parts, and second vertical parts. A heating coil supporting member that supports the heating coils is disposed to be bridged between the first horizontal
(Continued)

parts of the opposite side surfaces of the framework, and the heating coil unit having the heating coil is configured to be securely supported by the first horizontal parts.

9 Claims, 17 Drawing Sheets

(51) Int. Cl.
*H05B 6/02* (2006.01)
*H05B 6/06* (2006.01)

(58) Field of Classification Search
CPC . H05B 6/36; H05B 3/68; H05B 6/105; H05B 6/04; Y02B 40/126; F24C 15/102; A47J 37/0676; A47J 37/0704; A47J 37/0611; A47J 27/0813; A21B 7/005; A21B 1/48; B65D 81/3453; B65D 81/343; G01N 33/10
USPC ....... 219/620, 622, 624, 675, 676, 627, 621, 219/672, 453.13, 452.11, 451.1, 450.1, 219/443.1, 626, 635, 660; 99/326, 339, 99/331, 340, 324, DIG. 14, 337; 426/113, 321
See application file for complete search history.

(56) References Cited

U.S. PATENT DOCUMENTS

2011/0100980 A1* 5/2011 Kitaizumi ............ H05B 6/1245
219/624

2012/0223070 A1* 9/2012 Matsui ................. H05B 6/1254
219/677

FOREIGN PATENT DOCUMENTS

| EP | 1005254 A2 | 5/2000 |
|---|---|---|
| EP | 2408262 A1 | 1/2012 |
| EP | 2427032 A2 | 3/2012 |
| JP | 2002-33184 A | 1/2002 |
| JP | 2004-172138 A | 6/2004 |
| JP | 2009-11400 A | 1/2009 |
| JP | 2012-243602 A | 12/2012 |
| WO | WO 2010/103766 A1 | 9/2010 |

OTHER PUBLICATIONS

JP 2009 011400 A Machine Translation; Takagi Masanori; Custom Kitchen; Jan. 22, 2009.*
International Preliminary Report on Patentability, and English language translation thereof, in International Application No. PCT/JP2014/001342, dated Oct. 8, 2015, 13 pages.
Office Action and Search Report, and partial English language translation thereof, in corresponding Chinese Application No. 201480001538.2, dated Jun. 30, 2015, 8 pages.
International Search Report, and English language translation thereof, in corresponding International Application No. PCT/JP2014/001342, dated May 27, 2014, 3 pages.
Extended Search Report in corresponding European Application No. 14775568.0, dated Mar. 10, 2016, 8 pages.

* cited by examiner

INDUCTION HEATING COOKING DEVICE

This application is a 371 application of PCT/JP2014/001342 having an international filing date of Mar. 10, 2014, which claims priority to JP 2013-068098 filed Mar. 28, 2013 and JP 2013-158595 filed Jul. 31, 2013, the entire contents of which are incorporated herein by reference.

TECHNICAL FIELD

The present invention relates to an induction heating cooking device that is used for business or at standard homes, and relates more particularly to an installation configuration of a heating coil in the induction heating cooking device.

BACKGROUND ART

Conventionally, this type of an induction heating cooking device has had springs installed on components inside a main body, and has had a heating coil unit pressed against a top plate with the springs so that a distance between the heating coil and the top plate has been held (see Patent Literature 1 and Patent Literature 2, for example).

FIG. 23 shows a side sectional view of a conventional induction heating cooking device described in Patent Literature 1 and Patent Literature 2. As shown in FIG. 23, the conventional induction heating cooking device is configured by a box body consisting of a top plate 101 on which a cooking container as an object to be heated is placed, a frame 102 that covers side surfaces and an upper surface of outer peripheral edges of the top plate 101, and a framework 103 that configures side surfaces and a bottom surface of a main body as the induction heating cooking device. Inside the box body, a plurality of circuit substrates 104 that configure a drive control circuit for supplying a high-frequency current to a heating coil 109 are individually installed on substrate bases 105. The substrate bases 105 are placed in superposition on and fixed to the bottom surface of the framework 103.

A substrate base cover 106 is provided on the upper part of the circuit substrates 104. Springs 107 are placed on the substrate base cover 106, and the springs 107 support a coil base 108 by biasing the coil base 108 upward from below. The heating coil 109 is placed on the coil base 108. A vibration-proof rubber 110 is disposed on the coil base 108, near the outer peripheral part of the heating coil 109. When the springs 107 have pressed the coil base 108 upward, the upper surfaces of the vibration-proof rubbers 110 are brought into contact with the rear surface of the top plate 101, and a distance between the heating coil 109 and the top plate 101 is held at a constant distance. Ring-shaped ribs 111 for positioning are provided at the outer periphery of a portion of the coil base 108 that receives the springs 107, and the upper parts of the springs 107 fit inner sides of the ribs 111. A casing 114 is placed on and fixed to the bottom surface of the framework 103, while covering a blade 113 that is installed on a motor 112 and holding the motor 112. Then, the main body is disposed in the kitchen in such a way as to be hung on a top board 115 of the kitchen with a flange 103a of an upper part of the framework 103 and with the frame 102.

In the conventional induction heating cooking device configured as described above, components are stacked on the bottom surface of the framework 103, and the heating coil 109 is further paced on the upper parts of these components. Therefore, there occurs a phenomenon that the bottom surface of the framework 103 is deflected to a lower direction by load. Accordingly, when the heating coil 109 is fixed to the substrate base cover 106 without biasing upward the coil base 108 on which the heating coil 109 is placed, it has not been possible to keep constant a distance between the heating coil 109 and the top plate 101.

Consequently, in the configuration shown in FIG. 23, the top plate 101 is mounted on the framework 103, by providing the springs 107 between the coil base 108 and the substrate base cover 106. By providing the configuration in this way, the lower surface of the top plate 101 is brought into contact with the upper surfaces of the vibration-proof rubbers 110, and the coil base 108 is pressed down to a lower direction, so that the springs 107 become in a compressed state. As a result, a constant distance can be maintained between the heating coil 109 that is placed on the coil base 108 and the top plate 101. Therefore, the springs 107 in the induction heating cooking device are always in a compressed state. Further, by providing on the coil base 108 the ribs 111 to which the upper parts of the springs 107 fit, the coil base 108 is prevented from being deviated to a horizontal direction.

In the conventional induction heating cooking device configured as described above, load of many components including the heating coil unit inside the main body is always applied to the bottom surface of the framework 103. Therefore, after passing a long period, the bottom surface of the framework 103 has a possibility of being further deformed. However, the conventional induction heating cooking device is configured to have the springs 107 provided between the coil base 108 and the substrate base cover 106 so that the springs 107 press the vibration-proof rubbers 110 that are installed on the coil base 108 to the rear surface of the top plate 101. Therefore, a constant distance between the heating coil 109 and the top plate 101 can be secured without a change in the distance.

According to the induction heating cooking device, when the distance between the cooking container as an object to be heated that is placed on the top plate 101 and the heating coil 109 has changed, a high-frequency voltage and a high-frequency current that are generated in the inverter circuit which supplies the high-frequency current to the heating coil 109 change. As a result, product performance based on the design cannot be obtained. Therefore, maintaining the distance between the cooking container and the heating coil 109 without changing the distance is an extremely important subject in keeping the performance of the induction heating cooking device.

CITATION LIST

Patent Literature

PLT 1: JP 2002-33184 A
PLT 2: JP 2004-172138 A

SUMMARY OF THE INVENTION

Technical Problem

In a general induction heating cooking device, in a supporting configuration of the induction heating coil, supporting at three points at minimum is necessary, to stably support the induction heating coil of an approximately circle shape.

According to the conventional induction heating cooking device as described above, it has been necessary to provide a plurality of springs 107 equal to or more than three, in order to provide a configuration of uniformly pressing the coil base 108 to the top plate 101 via the vibration-proof rubbers 110. Further, on the substrate base cover 106 that supports the springs 107 and on the coil base 108 that receives the springs 107, it has been necessary to form the ribs 111 as spring receiving parts so that the springs 107 uniformly press the vibration-proof rubbers 110 to the top plate 101.

Further, usually, on the rear surface of the top plate 101, printing has been performed for various purposes. Therefore, according to the conventional induction heating cooking device, special members made of soft materials such as rubber are necessary so as not to hurt the printing, and the number of components becomes large. This situation has interrupted simplification of a configuration.

Further, an attempt to dispose the circuit substrates 104 below the heating coil 109 has necessitated members and a space for supporting the springs 107.

Further, in the case of providing a heating coil unit having different specifications on the substrate base cover 106, it is necessary to separately form positions for receiving springs, in order to support coil bases of different shapes on the substrate base cover, so as to be able to dispose the coil bases of the different shapes. As described above, the above conventional induction heating cooking device has had a problem in that the coil base 108 or the substrate base cover 106 cannot be configured in a simple shape.

Further, according to the above conventional induction heating cooking device, because the plurality of springs 107 are used, stress is generated in the top plate 101 due to pressing force that is always received from the coil base 108. Therefore, there has been a problem in that the top plate 101 is likely to be easily broken when receiving impact.

The present disclosure has been made in view of the above problem in the conventional induction heating cooking device, and has an object of providing an induction heating cooking device that can avoid stress attributable to pressing force applied from a heating coil unit to a top plate, that can maintain a constant distance between the top plate and heating coil, and that can achieve simplification of a configuration by reducing the number of components and thinning the main body as well as improving easiness of assembling the main body.

Solution to Problem

In order to achieve the object, an induction heating cooking device according to the present disclosure comprises a top plate on which an object to be heated is placed;

a framework which has an opening portion of an approximately rectangular shape above, which is formed in a box shape by a bottom surface and side surfaces, and which has the top plate provided above; and a heating coil unit which is provided inside the framework, and which has a heating coil that induction heats the object to be heated and a heating coil supporting member that supports the heating coil, wherein at least a set of opposite side surfaces of the framework are configured to have first vertical parts that are formed by being bent upward at outer edge parts of the bottom surface, first horizontal parts that are formed by being bent to an outer side at upper edge parts of the first vertical parts; and second vertical parts that are bent upward at outer edge parts of the first horizontal parts and form the opening portion by upper edge parts, and the heating coil unit is configured to be supported by the first horizontal parts.

The induction heating cooking device according to the present disclosure as described above is configured such that the heating coil unit is supported by the first horizontal parts that are held by the first vertical parts and the second vertical parts which configure the side surfaces of the framework and that are not likely to be easily deformed in the upper and lower direction. Therefore, it is possible to maintain a constant distance between the top plate which is provided at the upper part of the framework and the heating coil.

Advantageous Effects of the Invention

The induction heating cooking device according to the present disclosure can avoid stress attributable to pressing force applied from the heating coil unit to the top plate, can maintain a constant distance between the top plate and the heating coil, and can achieve simplification of a configuration by reducing the number of components and thinning the main body as well as improving easiness of assembling the main body.

DETAILED DESCRIPTION OF THE PREFERRED EMBODIMENTS

Figure 1:
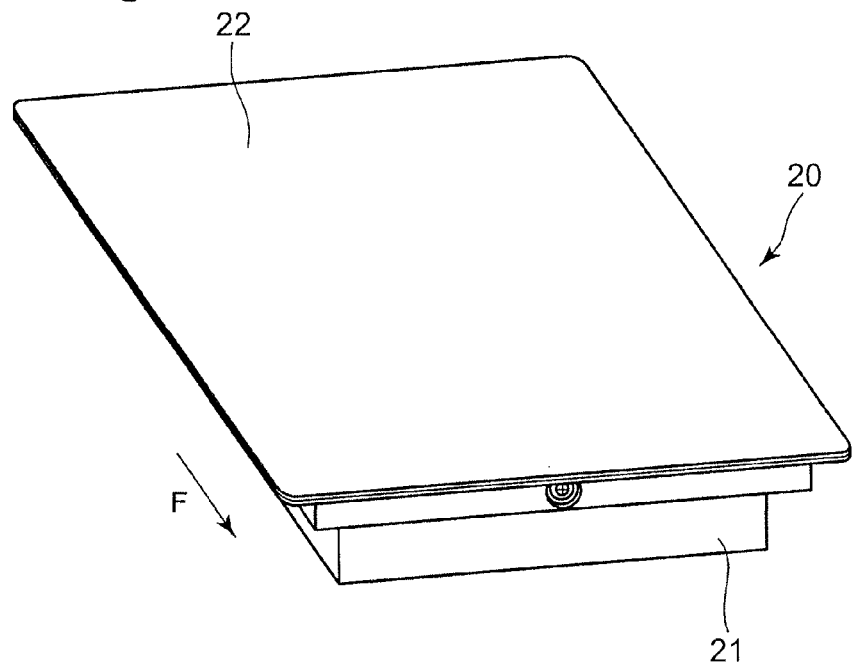
FIG. 1 is a perspective view showing a main body as the induction heating cooking device according to a first embodiment of the present disclosure.

An induction heating cooking device of a first aspect according to the present disclosure comprises
a top plate on which an object to be heated is placed;
a framework which has an opening portion of an approximately rectangular shape above, which is formed in a box shape by a bottom surface and side surfaces, and which has the top plate provided above; and
a heating coil unit which is provided inside the framework, and which has a heating coil that induction heats the object to be heated and a heating coil supporting member that supports the heating coil, wherein
at least a set of opposite side surfaces of the framework are configured to have first vertical parts that are formed by being bent upward at outer edge parts of the bottom surface,
first horizontal parts that are formed by being bent to an outer side at upper edge parts of the first vertical parts; and
second vertical parts that are bent upward at outer edge parts of the first horizontal parts and form the opening portion by upper edge parts, and
the heating coil unit is configured to be supported by the first horizontal parts.

In the induction heating cooking device, a distance between the top plate and the heating coil, that is, a distance between the object to be heated and the heating coil, gives a large influence to the electric performance of the induction heating cooking device. Therefore, keeping the constant distance is one of important design elements of the induction heating cooking device. The conventional induction heating cooking device is configured to place and install configuration components such as the heating coil and the supporting members on the bottom surface of the framework. Therefore, the conventional induction heating cooking device has a structure in which the bottom surface is likely to be easily deflected and deformed in the upper and lower direction by the weight of the configuration components that are placed on the bottom surface, and a distance between the top plate and the heating coil is likely to easily change. On the other hand, in the induction heating cooking device of the present disclosure, the first horizontal parts of the side surfaces of the framework that support the heating coil unit are structured to be held by the first vertical parts and the second vertical parts which configure the framework, and are not likely to be easily deformed in the upper and lower direction. Because the heating coil unit is configured to be supported by the first plane parts, a distance between the top plate which is provided at the upper part of the framework and the heating coil is not likely to easily change as compared with the conventional configuration, and is maintained approximately constant.

In the induction heating cooking device of the first aspect according to the present disclosure, the heating coil is placed on the heating coil supporting member of an approximately planar shape and supported, and vicinities of the end parts of the heating coil supporting member are configured to be held by being bridged to the side surfaces that are not easily deformed by the load in the upper and lower direction out of the framework of the main body. Because the induction heating cooking device of the first aspect which is configured in this way can reduce deformation of the framework by the weight of the heating coil and the like, a position of the heating coil becomes stable. Further, in the configuration of the induction heating cooking device of the first aspect, the springs for supporting the heating coil become unnecessary, and the restricting members for restricting positions against the biasing force of the springs also become unnecessary. Therefore, simplification of the configuration of the induction heating cooking device can be achieved.

In an induction heating cooking device of a second aspect according to the present disclosure, the opposite side surfaces of the framework in the above-mentioned first aspect are configured to have further second horizontal parts that are formed by being bent to an outer side or an inner side at the upper edge parts of the second vertical parts, and upper surfaces of the second horizontal parts are configured to be in contact with the top plate.

Because the induction heating cooking device of the second aspect which is configured as described above is configured so that the outer peripheral part of the framework is brought into contact with the top plate by being bent to an outer side or an inner side, a variation in the side surface of the framework is prevented. Further, in the case where the outer peripheral part of the framework is bent to an outer side, the outer peripheral part of the framework in the induction heating cooking device that is built in the kitchen is held between the top plate and the kitchen, and the load of the main body is supported by the kitchen.

In the above-mentioned first or second aspect, an induction heating cooking device of a third aspect according to the present disclosure further comprises a heating coil unit supporting member that supports the heating coil unit, wherein the heating coil unit supporting member is fixed to the first horizontal parts, and the heating coil unit is configured to be supported by the first horizontal parts with the heating coil unit supporting member.

In the induction heating cooking device of the third aspect which is configured as described above, the heating coil unit of a shape that cannot be directly installed as it is on the first horizontal parts in the first or second aspect can be installed at a proper position, by making the first horizontal parts support the heating coil unit, with heating coil unit supporting members. By using this configuration, in the case of assembling as a separate machine type, by mounting a heating coil unit of a different shape by sharing the framework, or in the case of providing in the same framework a plurality of heating coil units of different shapes, for example, this configuration can be employed.

In the above-mentioned first or second aspect, an induction heating cooking device of a fourth aspect according to the present disclosure has a joint member of which both end parts are placed on and fixed to the two first horizontal parts that are parallel and face each other in the framework, and the heating coil unit is configured to be supported by the first horizontal parts with the joint member.

In the induction heating cooking device of the fourth aspect which is configured as described above, by using the joint member, the heating coil unit can be supported by utilizing the horizontal parts of the side surfaces that are disposed perpendicularly to the two horizontal parts by not only utilizing the two opposing horizontal parts that are parallel to each other on the side surfaces of the framework. Further, the joint member can be easily formed, by bending the cross section in a U shape, for example, to have a shape having strength not to cause the joint member to be deformed in the lower direction by the own weight of the heating coil unit. As described above, because the heating coil unit has the configuration supported by the horizontal parts and the joint member that are not likely to be easily deformed in the lower direction, the distance between the top plate and the heating coil unit can be stabilized.

In the above-mentioned fourth aspect, an induction heating cooking device of a fifth aspect according to the present disclosure further comprises a heating coil unit supporting member that supports the heating coil unit, wherein the heating coil unit supporting member is supported by the joint member, and the heating coil unit is configured to be supported by the joint member with the heating coil unit supporting member.

In the induction heating cooking device of the fifth aspect which is configured as described above, the heating coil unit of a shape of which the joint member cannot be directly installed on the first horizontal parts in the fourth aspect can be installed at a proper position, by making the joint member support the heating coil unit on the first horizontal parts, with heating coil unit supporting members. For example, by sharing the installation portion to the joint member of a plurality of heating coil units which have different shapes, and by forming the joint member or heating coil unit supporting members into shapes that match the heating coil units of different shapes, the heating coil units of the different shapes can be configured to be installed on the first horizontal parts via joint members and/or heating coil unit supporting members. By providing the configuration in this way, because the framework or the heating coil unit does not have a complex shape that has installation portions at a plurality of positions, a product that can be easily assembled can be provided, without an assembling error.

In an induction heating cooking device of a sixth aspect according to the present disclosure in the above-mentioned third or fifth aspect, the heating coil unit supporting member is provided with reinforcement longitudinal walls that are in contact with inner surfaces of the first vertical parts and are formed to protrude downward.

In the induction heating cooking device of the sixth aspect which is configured as described above, by increasing the strength of heating coil unit supporting members, the heating coil unit supporting members can be made not easily bent downward. For example, at the time of setting the product in the kitchen, there is a case where the bottom surface of the product receives impact, and stress which is proportional to the own weight of the heating coil unit is applied to heating coil unit supporting members. Because the heating coil unit supporting members are placed on and fixed to the first horizontal parts, there is a risk that the heating coil unit supporting members are deflected in the lower direction and are deformed, using fixed parts of the horizontal parts as supporting points. When the heating coil unit supporting members are deformed and when the surfaces that support the heating coil unit move to the lower direction, a distance between the heating coil unit and the top plate becomes large. However, in the induction heating cooking device of the sixth aspect, because the reinforcement longitudinal walls are provided in the heating coil unit supporting members, the strength of the heating coil unit supporting members is increased, and the heating coil unit supporting members are configured not to be easily bent downward. Therefore, in the configuration of the induction heating cooking device of the sixth aspect, the heating coil unit supporting members can be prevented from being deformed, and a change in the distance between the heating coil unit and the top plate can be prevented.

An induction heating cooking device of a seventh aspect according to the present disclosure in the above-mentioned first to sixth aspects, installation positions of the heating coil supporting member may be configured to be able to be changed to a front and rear direction or a right and left direction, relative to the first horizontal parts on the opposite side surfaces of the framework.

In the induction heating cooking device of the seventh aspect which is configured as described above, by only changing the installation position of the heating coil supporting member, the heating coil in the framework can be disposed at an optimum position, and development of a product variation can be easily performed.

An induction heating cooking device of an eighth aspect according to the present disclosure in the above-mentioned first to seventh aspects, a circuit substrate that drive controls the heating coils is provided below the heating coil supporting member and may be configured to be supported by the bottom surface of the framework.

In the induction heating cooking device of the eighth aspect which is configured as described above, because members that support the heating coil and the installation structure of the heating coil become unnecessary below the heating coil, there is no waste in the wiring routing structure at the time of providing the circuit substrate for the power supply circuit and the like below the heating coil supporting member, and the external shape of the framework can be made smaller. Therefore, space saving and cost reduction can be achieved. Further, because a large space that is spread in the horizontal direction can be obtained without supporting pillars and the like below the heating coil supporting member, a plurality of circuit substrates including the power supply circuit and the like can be disposed in approximately the horizontal direction, and the main body can be thinned. Further, it becomes easy to have a plurality of circuit substrates integrated together. As a result, because wires that connect between a plurality of circuit substrates become unnecessary, reduction of the assembly man-hours and component cost can be achieved.

An induction heating cooking device of a ninth aspect according to the present disclosure in the above-mentioned first to eighth aspects, the heating coil supporting member may be configured by a non-magnetic metal.

In the induction heating cooking device of the ninth aspect, by forming the heating coil supporting member by a non-magnetic metal such as aluminum, the heating coil supporting member can also work as a shield member for preventing erroneous heating of a magnetic metal member which is near the rear surface of the heating coil. Therefore, the space below the heating coil can be reduced, the number of components can be reduced, and thinning, weight reduction, and cost reduction of the product can be achieved.

Hereinafter, the induction heating cooking device will be described as embodiments according to the present disclosure, with reference to the appended drawings. The induction heating cooking device of the present disclosure is not limited to the configuration of the induction heating cooking device described in the following embodiments, and includes a device configured based on the technical idea equivalent to the technical idea described in the following embodiments.

First Embodiment

Figure 2:
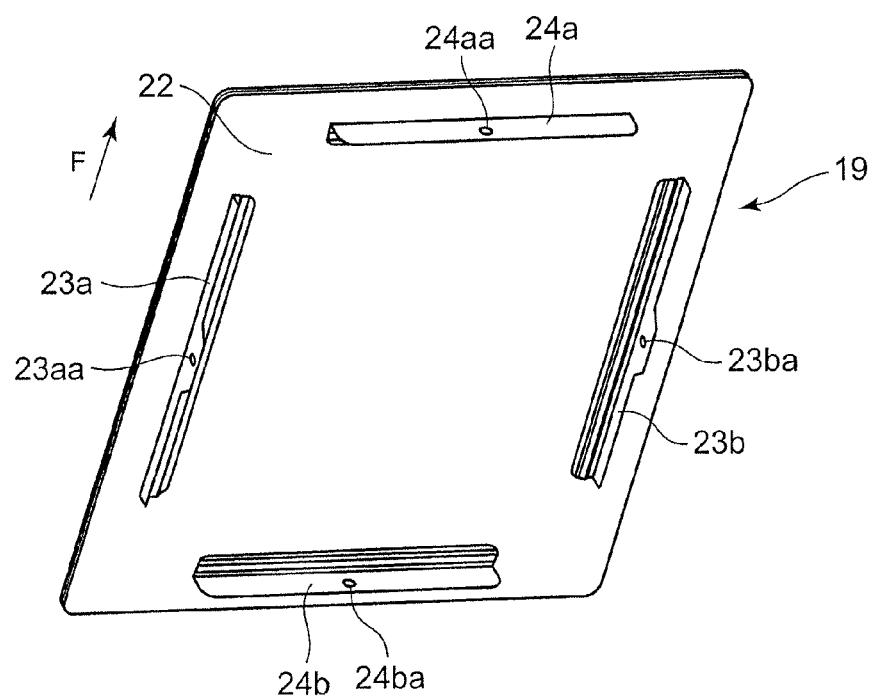
FIG. 2 is a perspective view looked at from the rear of a top plate unit of the induction heating cooking device according to the first embodiment.
Figure 3:
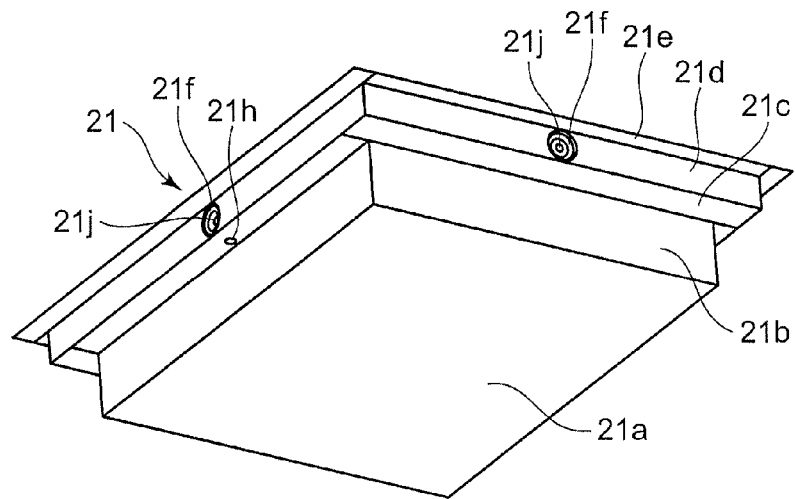
FIG. 3 is a perspective view looked at from below of the state that the top plate unit is detached in the induction heating cooking device according to the first embodiment.
Figure 4:
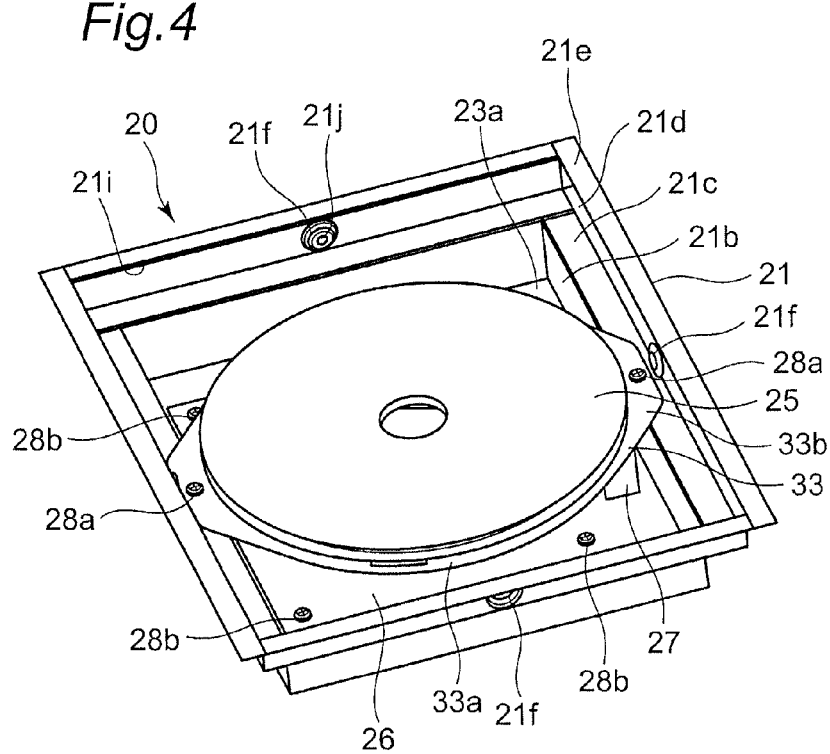
FIG. 4 is a perspective view looked at from above of the state that the top plate unit is detached in the induction heating cooking device according to the first embodiment.

FIG. 1 is a perspective view showing a main body as the induction heating cooking device according to a first embodiment of the present disclosure. FIG. 2 is a perspective view looked at from the rear of a top plate unit of the induction heating cooking device according to the first embodiment. FIG. 3 is a perspective view looked at from below of the main body in the state that the top plate unit is detached in the induction heating cooking device according to the first embodiment. FIG. 4 is a perspective view looked at from above of the main body in the state that the top plate unit is detached in the induction heating cooking device according to the first embodiment.

As shown in FIG. 1, a main body 20 as the induction heating cooking device according to the first embodiment includes a framework 21 which has an approximately rectangular parallelepiped shape, and a top plate 22 which is provided on the framework 21 and on which a cooking container as an object to be heated is placed. In FIG. 1, an arrow F indicates the front (a user side).

As shown in FIG. 2, a top plate unit 19 includes the top plate 22, a left side frame 23a, a right side frame 23b, a front frame 24a, and a rear frame 24b. The left side frame 23a that is extended to the front and rear direction is adhered to the left side of the rear surface (lower surface) of the top plate 22, and the right side frame 23b that is extended to the front and rear direction is adhered to the right side of the rear surface of the top plate 22. The front frame 24a that is extended to the right and left direction is adhered to the front side of the rear surface of the top plate 22, and the rear frame 24b that is extended to the right and left direction is adhered to the rear side of the rear surface of the top plate 22. The left side frame 23a, the right side frame 23a, the front frame 24a, and the rear frame 24b have approximately L-shaped cross sections that are orthogonal in respective longitudinal directions, and these frames are adhered to the top plate 22 so as to have vertical surfaces which are protruded downward from the rear surface of the top plate 22. The respective frames 23a, 23b, 24a, and 24b are formed with burring-processed buffing parts for fixing to the framework 21. The respective burring parts are formed with burring holes 23aa, 23ba, 24aa, and 24ba as screw holes. The respective burring holes 23aa, 23ba, 24aa, and 24ba are fastened with screws 28c (see FIG. 6) that have passed through through-holes which are formed on the framework 21, and the top plate unit 19 is configured to be fixed to the framework 21.

As shown in FIG. 3, the framework 21 has an approximately rectangular parallelepiped shape, and includes a bottom surface 21a of an approximately rectangular shape. The framework 21 is bent upward (in the vertical direction) at the outer edge parts of the bottom surface 21a, and is formed with first longitudinal walls 21b as first vertical parts having vertical surfaces. Further, the framework 21 is bent at the upper edge parts of the first longitudinal walls 21b to spread to an outer side, and is formed with the first plane parts 21c as first horizontal parts having horizontal surfaces. Further, the framework 21 is bent upward (in the vertical direction) at the outer edge parts of the first plane parts 21c, and is formed with second longitudinal walls 21d as second vertical parts having vertical surfaces. Further, the framework 21 is bent at the upper edge parts of the second longitudinal walls 21d to spread to an outer side, and is formed with second plane parts 21e as second horizontal parts having horizontal surfaces. In the first embodiment, the side surfaces of the framework 21 are configured by the first longitudinal walls 21b, the first plane parts 21c, the second longitudinal walls 21d, and the second plane parts 21e.

Figure 6:
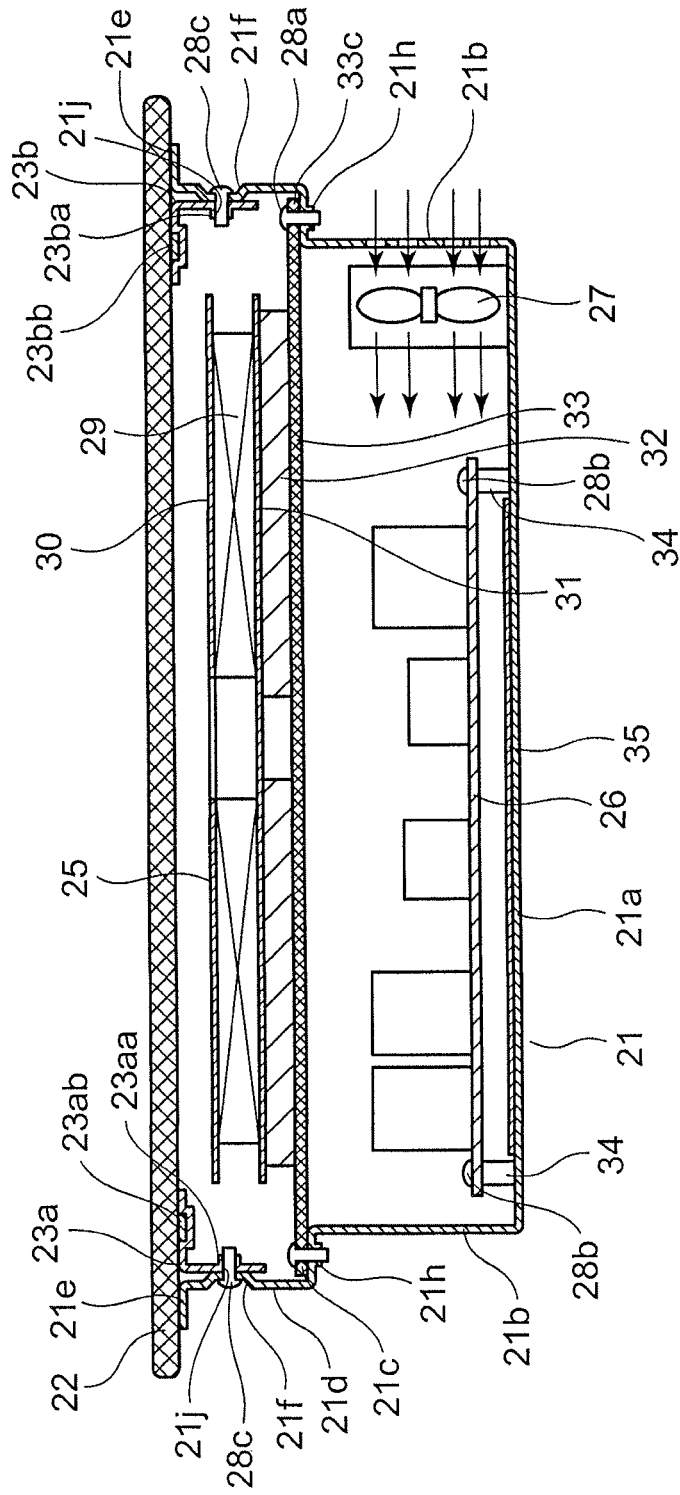
FIG. 6 is a side sectional view showing the induction heating cooking device according to the first embodiment.

The second longitudinal walls 21d of the framework 21 are formed with concave parts 21f that can house the heads of the screws 28c (see FIG. 6). Screw holes 21j through which the screws 28c pierce are provided on the plane portions (vertical portions) of the bottom parts of the concave part 21f.

On the horizontal portions of the first plane parts 21c of the framework 21, there are formed burring holes 21h (see FIG. 6) for fastening a heating coil unit 25 described later with the screw.

As shown in FIG. 4, the upper part of the framework 21 has an approximately rectangular opening portion 21i. Inside the framework 21, there are housed the heating coil unit 25, a circuit substrate 26 on which a drive control circuit (including a power supply circuit) for performing the induction heating is installed, and a fan 27 that cools the circuit substrate 26 and the like. The heating coil unit 25 is fixed to the first plane parts 21c, by fastening screws 28a that pierce through installation parts of the heating coil unit 25 (coil installation parts 33b described later with reference to FIG. 5), to the burring holes 21h provided on the first plane parts 21c of the framework 21. The circuit substrate 26 is configured to be fixed to the bottom surface 21a of the framework 21 by fastening the screws 28b.

Figure 5:
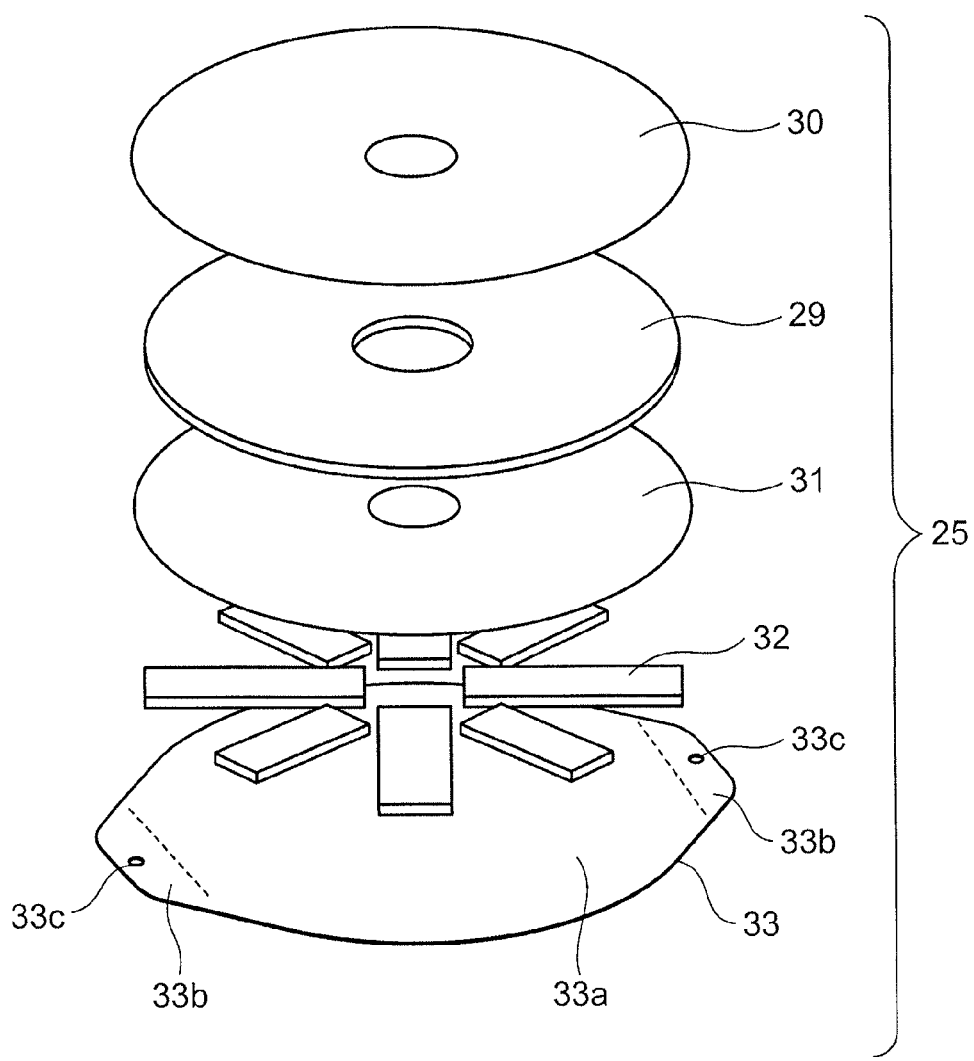
FIG. 5 is an exploded perspective view of the heating coil unit in the induction heating cooking device according to the first embodiment.

FIG. 5 is an exploded perspective view of the heating coil unit in the induction heating cooking device according to the first embodiment. In FIG. 5, the heating coil unit 25 includes a heating coil 29 that induction heats the cooking container by causing an eddy current to be generated in the bottom part of the cooking container as the object to be heated by generating a high-frequency magnetic field, a heat shield plate 30 that is placed at an upper side of the heating coil 29 and shields heat from the cooking container, an insulating plate 31 having an electric insulation property provided at a lower surface side of the heating coil 29, a ferrite 32 provided below the insulating plate 31 and molded in a shape of a plurality of bars having high permeability with a high magnetic flux absorption effect, and a shield plate 33 on which the ferrite 32 is placed and which is installed on the framework 21. The shield plate 33 is configured by a non-magnetic metal such as aluminum, to prevent erroneous heating of a member made of a magnetic metal which is closely adjacent to the heating coil 29 and to shield noise and the like that are generated from the heating coil 29. The heating coil unit 25 is obtained by having these configuration components stacked on and fixed to the shield plate 33, by adhesion with an adhesive and by bonding with a double-sided adhesive tape and the like, as integrated one unit. Therefore, in the configuration of the first embodiment, the shield plate 33 has a function as the heating coil supporting member.

In general, for the heating coil 29, there can be used various shapes such as a single shape that has no gap between winding wires, a double shape that has one gap provided between winding wires, a triple shape that has two gaps provided between winding wires, and an approximately circle shape or an elliptic shape as a shape of the outer periphery. In the first embodiment, the heating coil 29 will be described using a heating coil having an approximately circle shape in the outer peripheral shape, without providing a gap, as an exemplification. Sizes of the heat shield plate 30 and the insulating plate 31 are sufficient enough to cover the heating coil 29, and are not particularly limited. The heat shield plate 30 and the insulating plate 31 of the first embodiment can have simple shapes by forming the plane shape in an approximately circle shape according to the shape of the heating coil 29. The ferrite 32 is disposed below the heating coil 29. On the shield plate 33 as the heating coil supporting member, there are formed a coil receiving part 33a as a portion on which the ferrite 32 is placed, and the coil installation parts 33b provided at both sides of an outer side of the coil receiving part 33a. The coil installation parts 33b are provided with screw holes 33c for installing the heating coil unit 25.

Figure 7:
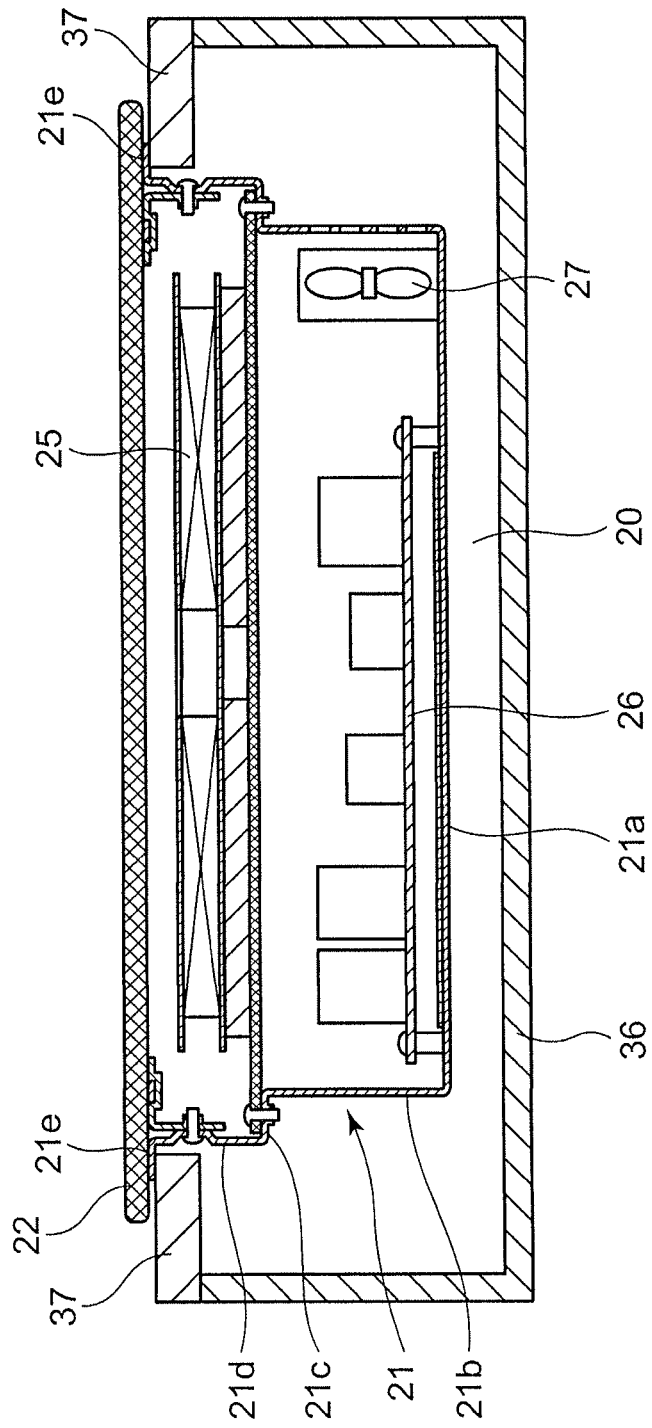
FIG. 7 is a side sectional view showing a state that the induction heating cooking device according to the first embodiment is built in the kitchen.

FIG. 6 is a side sectional view showing a main body as the induction heating cooking device according to the first embodiment. FIG. 7 is a side sectional view showing a state that the main body as the induction heating cooking device according to the first embodiment is built in the kitchen.

In FIG. 6, concave parts 23ab and 23bb are provided respectively on the upper surfaces of the left side frame 23a and the right side frame 23b that are at the right and left of the rear surface (lower surface) of the top plate 22. The left side frame 23a and the right side frame 23b are adhered to the rear surface of the top plate 22 by the adhesive coated respectively on the concave parts 23ab and 23bb. Although not shown, the front frame 24a and the rear frame 24b have also configurations similar to those of the left side frame 23a and the right side frame 23b, and are adhered to the rear surface of the top plate 22. The top plate unit 19 configured by the top plate 22 to which the frames 23a, 23b, 24a, and 24b are adhered is placed on the second plane parts 21e as the outer edge portions of the framework 21. Thereafter, in the state that the rear surface of the top plate 22 is in contact with the second plane parts 21e, the screws 28c which have pierced through the screw holes 21j provided on the second longitudinal walls 21d as the second vertical parts of the framework 21 are fastened to the burring hole 23aa and the burring hole 23ba which are provided on the vertical portions of the left side frame 23a and the right side frame 23b. As a result, the top plate unit 19 is installed on and fixed to the framework 21. Further, similarly, although not shown, to the burring holes 24aa and 24ba that are provided on the vertical portions of the front frame 24a and the rear frame 24b, the screws 28c that have pierced through the screw holes provided on the second longitudinal walls 21d as the second vertical parts of the framework 21 are fastened so that the top plate unit 19 is fixed to the framework 21 (see FIG. 2).

In the shield plate 33 as the heating coil supporting member that holds the configuration components of the heating coil unit 25, the coil installation parts 33b are placed on the first plane parts 21c as the first horizontal parts, and are disposed inside the framework 21. In the installation of the heating coil unit 25, the screws 28a that pierce through the screw holes 33c provided on the coil installation parts 33b are fastened to the burring holes 21h of the first plane parts 21c of the framework 21. As a result, the shield plate 33 is fixed to the first plane parts 21c, and the heating coil unit 25 is fixed to the framework 21.

The circuit substrate 26 that is disposed at a lower side of the heating coil unit 25 inside the framework 21 is installed on the bottom surface 21a of the framework 21 via legs 34. A fan 27 is also placed on and fixed to the bottom surface 21a. A second insulating plate 35 is disposed between the circuit substrate 26 and the bottom surface 21a of the framework 21, so that electric insulation between the circuit substrate 26 and the bottom surface 21a is secured.

As shown in FIG. 7, a kitchen that includes the induction heating cooking device of the first embodiment is configured by a main body 36 of the kitchen and a top board 37 of the kitchen. The second plane parts 21e as the second horizontal parts of the outermost periphery of the framework 21 in the induction heating cooking device are configured to be engaged with the edge parts of the opening portion periphery of a top board 37 of the kitchen. In this way, the second plane parts 21e of the framework 21 of the induction heating cooking device are hung on the edge parts of the top board 37 of the kitchen, and the framework 21 is suspended so that the main body 20 of the induction heating cooking device is provided within the kitchen.

The operation and the work of the induction heating cooking device according to the first embodiment having the above configuration will be described below.

In general, the framework of the induction heating cooking device is formed by bend processing a thin plate (a 0.5 mm thickness, for example). Because the bottom surface of the framework has a large area, and because heavy goods such as a circuit substrate and a fan are placed, the bottom surface of the framework is deformed by being warped in the lower direction. Assuming that the induction heating cooking device as a product is configured to be placed on the table, for example, warpage of the bottom surface of the framework can be suppressed by placing the induction heating cooking device on the table by providing auxiliary legs or the like beneath the bottom surface of the framework. However, a general induction heating cooking device is configured to be suspended by the top board 37 of the kitchen, like the configuration of the induction heating cooking device of the first embodiment. Therefore, the bottom surface of the framework cannot be supported from below, and it is difficult to suppress the warpage of the bottom surface. Consequently, when the heating coil unit is a structure stacked on the bottom surface of the framework and also when this structure is configured to be supported by the bottom surface of the framework, for example, a distance from the top plate to the heating coil unit is changed due to the warpage of the bottom surface.

In the induction heating cooking device according to the first embodiment, the coil installation parts 33b of the shield plate 33 at the lowest end of the heating coil unit 25 are configured to be fixed to the first plane parts 21c as the horizontal portions on the side surface of the framework 21 and fix the heating coil unit 25 to the framework 21. By configuring in this way, on the side surface of the framework 21, the first longitudinal walls 21b and the second longitudinal walls 21d as the vertical portions receive stress of pulling to the lower direction from the bottom surface 21a. However, the metal as the material of the framework 21 is not extended to the vertical direction by this stress, and the first longitudinal walls 21b and the second longitudinal walls 21d are little deformed to the upper and lower direction. The horizontal portions of the first plane parts 21c can be configured to have little distance over which the horizontal portions substantially move to the upper and lower direction due to deformation of the first plane parts 21c, by narrowing the horizontal portion to a width necessary to support the coil installation parts 33b of the shield plate 33. Further, in order that the whole of the upper surfaces of the second plane parts 21e as the top end portions of the framework 21 is brought into contact with the rear surface of the top plate 22, it is arranged such that the left side frame 23a, the right side frame 23b, the front frame 24a, and the rear frame 24b that are fixed to the rear surface of the top plate 22 are fixed to the second longitudinal walls 21d as the second vertical parts of the framework 21. Therefore, the induction heating cooking device of the first embodiment that is configured to be suspended by the top board 37 of the kitchen has also the structure in which the top plate 22 is not easily separated from the second plane parts 21e and the second plane parts 21e are not easily deformed.

Further, in the first embodiment, although the second plane parts 21e are configured to be directed from the second longitudinal walls 21d to an outer side, the second plane parts 21e may be configured to be directed to an inner side. In this case, a similar effect can be obtained, by configuring each frame that is fixed to the rear surface of the top plate 22 to be at an outer side of the second longitudinal walls 21d.

As described above, in the induction heating cooking device according to the first embodiment, a deviation in the mutual positional relationship in the upper and lower direction between the top plate 22 and the heating coil unit 25 can be suppressed. Further, in the induction heating cooking device according to the first embodiment, because the heating coil unit 25 is not configured to always receive the pressing force by the springs like the conventional configuration, the heating coil unit 25 is not easily deformed, and the distance in the upper and lower direction between the top plate 22 and the heating coil 29 does not change. Therefore, the heating coil unit 25 is configured to be able to continuously maintain a constant distance.

Further, because the shield plate 33 that supports the heating coil unit 25 is configured to be placed on and fixed to the first plane parts 21c of the framework 21 (the surface and the surface are fixed in contact with each other), the heating coil unit 25 is prevented from being deviated to the vertical direction and the horizontal direction. Further, because the coil installation part 33b of the shield plate 33 can be made small, the heating coil unit 25 can be configured in compact. Further, the configuration according to the first embodiment has no provision of springs, components for receiving the springs are not necessary. As a result, the load applied to the bottom surface 21a of the framework 21 can be reduced, and the load applied from the bottom surface 21a of the framework 21 to the side surface of the framework 21 can be also reduced. Because the load of the heating coil unit 25 is not configured to be directly applied to the bottom surface 21a, the load applied to the bottom surface 21a is reduced substantially as compared with the conventional practice. Therefore, the induction heating cooking device according to the first embodiment can be configured so that the framework 21 is not likely to be easily deformed. Further, because the shield plate 33 is not applied with heavy goods such as the circuit substrate 26, deflection can be suppressed. The shield plate 33 is sufficient enough to support only the heating coil unit, and because the weight is small, deformation such as deflection can be suppressed.

Figure 23:
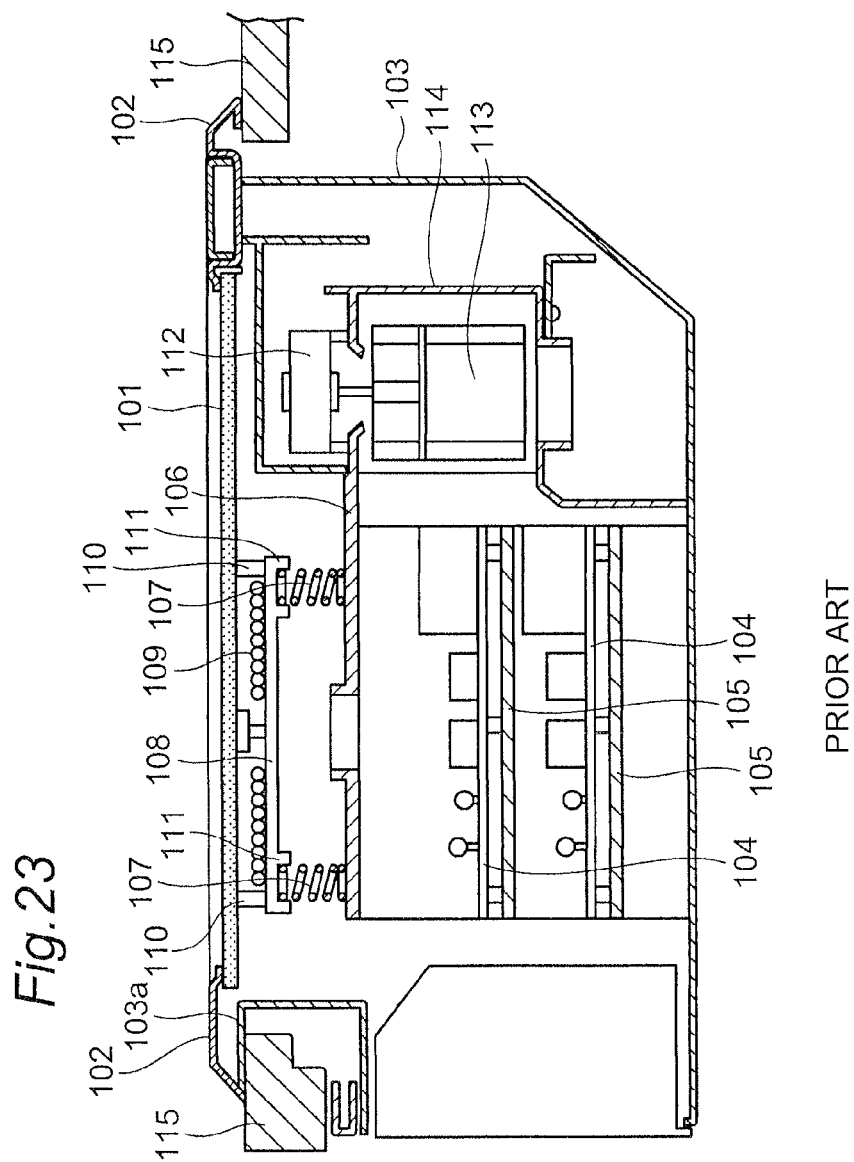
FIG. 23 shows the side sectional view of the conventional induction heating cooking device.

Further, in the conventional configuration (see FIG. 23), the top plate is configured to always receive pressing force from the heating coil unit and generate stress. Therefore, there has been a problem in that distortion and breakage occurs in the top plate unless the top plate is reinforced by a frame made of a metal not shown. Therefore, in the conventional configuration, in the case where holding members such as the left side frame 23a, the right side frame 23b, the front frame 24a, and the rear frame 24b are installed by adhesion on the rear surface of the top plate 22 like in the first embodiment, there is a risk that the installation portions are peeled off from the top plate 22.

However, according to the configuration in the first embodiment, because the top plate 22 is not configured to receive the load of pressing force to the upper direction from the heating coil unit 25, even when the left side frame 23a, the right side frame 23b, the front frame 24a, and the rear frame 24b have been fixed to the rear surface of the top plate 22 by the adhesive, the risk that these components are peeled off from the top plate 22 is substantially reduced.

In the first embodiment, while that the step parts are provided on respective side surfaces of the four sides of the opening portion 21i of the framework 21 is exemplified, the step parts may be provided on at least a set of opposing side surfaces.

Because the step parts of the framework 21 can be configured by bend processing, the step parts of the framework 21 can be manufactured without increasing the number of components of the framework 21.

Further, in the first embodiment, the heating coil unit 25 is placed on the separate shield plate 33, and two positions of the shield plate 33 are placed on the horizontal part. In this case, the shield plate 33 can be made small, and deformation becomes few. Therefore, accuracy of the distance becomes high. As compared with the case where a plurality of heating coil units 25 are placed on one shield plate 33, the thickness of the shield plate 33 can be made small, because rigidity of the shield plate 33 is not required.

In the configuration according to the first embodiment, the description has been made about the example that the first plane parts 21c as the first horizontal parts are formed by bending the upper edge parts of the first longitudinal walls 21b to spread to an outer side. However, in the present disclosure, the configuration is not limited to this. The first plane parts 21c as the first horizontal parts may be formed by bending the upper edge parts of the first longitudinal walls 21b to an outer side.

Second Embodiment

Figure 8:
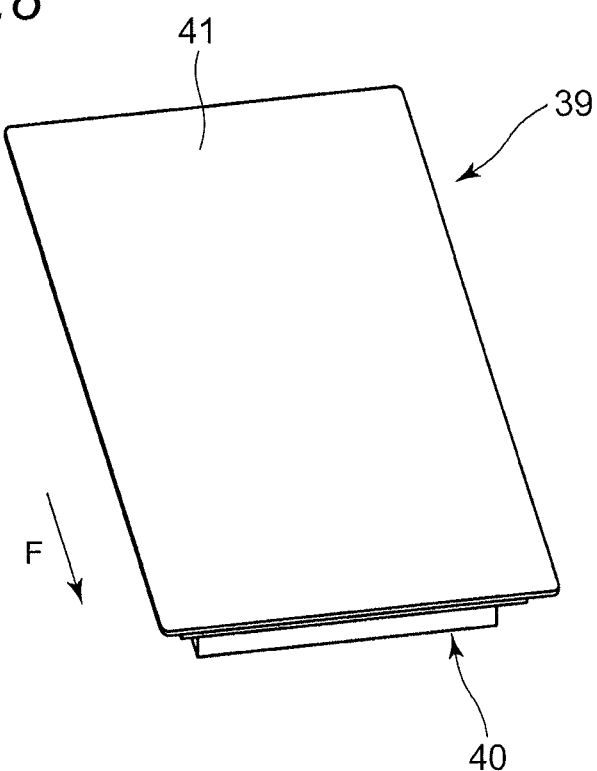
FIG. 8 is a perspective view showing an induction heating cooking device according to a second embodiment of the present disclosure.
Figure 9:
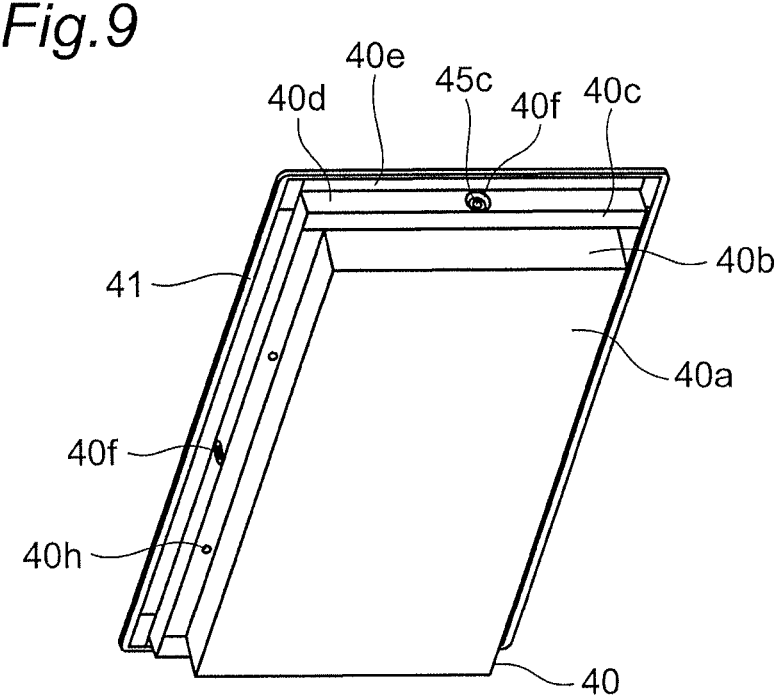
FIG. 9 is a perspective view looked at from below of the induction heating cooking device according to the second embodiment.
Figure 10:
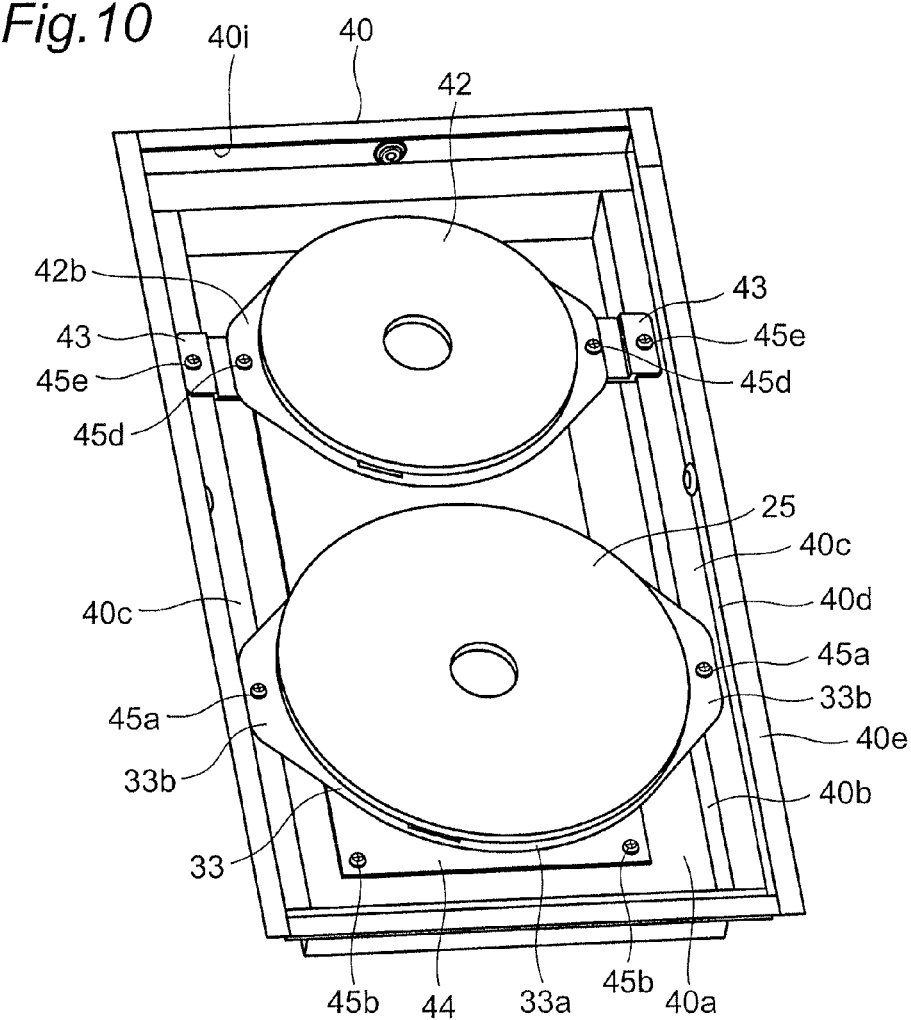
FIG. 10 is a perspective view looked at from above of the state that the top plate unit of the induction heating cooking device according to the second embodiment is detached.
Figure 11:
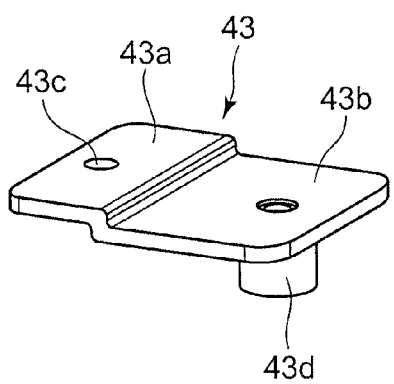
FIG. 11 is a perspective view showing a heating coil unit supporting member of the induction heating cooking device according to the second embodiment.
Figure 12:
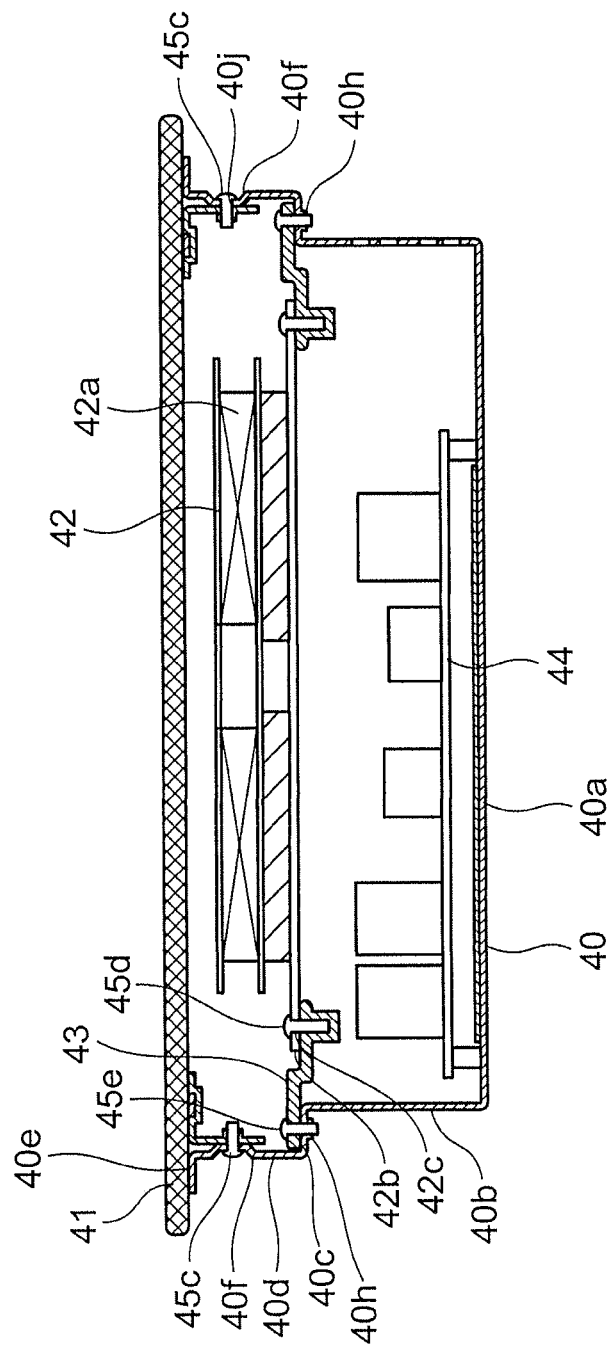
FIG. 12 is a side sectional view showing the induction heating cooking device according to the second embodiment.

Next, an induction heating cooking device according to a second embodiment of the present disclosure will be described with reference to appended FIGS. 8 to 12. FIG. 8 is a perspective view looked at from above of the main body of the induction heating cooking device according to the second embodiment of the present disclosure. FIG. 9 is a perspective view looked at from below of the main body of the induction heating cooking device according to the second embodiment. FIG. 10 is a perspective view looked at from above of the main body in the state that the top plate unit of the induction heating cooking device according to the second embodiment is detached. FIG. 11 is a perspective view showing a heating coil unit supporting member of the induction heating cooking device according to the second embodiment. FIG. 12 is a side sectional view showing the main body as the induction heating cooking device according to the second embodiment. In FIG. 8, the arrow F indicates the front (a user side).

In the following description of the second embodiment, because the basic configuration of the second embodiment is similar to the configuration of the above-mentioned first embodiment, description of similar points will not be repeated, and different points will be mainly described. Further, in the second embodiment, components that have functions and configurations similar to those of the first embodiment will be attached with the same symbols. A cooling configuration including a fan can be configured similarly to the first embodiment, and a corresponding drawing will not be presented.

As shown in FIG. 8 to FIG. 10, a main body 39 as the induction heating cooking device according to the second embodiment includes a framework 40 of a box shape having a bottom surface 40a of an approximately rectangular shape (see FIG. 9) and having an opening portion 40i of an approximately rectangular shape formed on the upper surface (see FIG. 10), and a top plate 41 that is provided on the framework 40.

As shown in FIG. 9, the framework 40 is bent upward (in the vertical direction) at the outer edge parts of the bottom surface 40a of an approximately rectangular shape, and has first longitudinal walls 40b as first vertical parts that have vertical surfaces. Further, the framework 40 is bent at the upper edge parts of the first longitudinal walls 40b to spread to an outer side, and is formed with first plane parts 40c as first horizontal parts having horizontal surfaces. Further, the framework 40 is bent upward (in the vertical direction) at the outer edge parts of the first plane parts 40c, and is formed with second longitudinal walls 40d as second vertical parts having vertical surfaces. Further, the framework 40 is bent at the upper edge parts of the second longitudinal walls 40d to spread to an outer side, and is formed with second plane parts 40e as second horizontal parts having horizontal surfaces. In the second embodiment, the side surface of the framework 40 is configured by the first longitudinal walls 40b, the first plane parts 40c, the second longitudinal walls 40d, and the second plane parts 40e.

The second longitudinal walls 40d of the framework 40 are formed with concave parts 40f that can house the heads of screws 45c (see FIG. 12). Screw holes 40j through which the screws 45c pierce are provided on the plane portions (vertical portions) of the bottom parts of the concave part 40f. In FIG. 9, because the screws 45c are installed on the concave parts 40f, the screw holes 40j shown in FIG. 12 are hidden and are not visible. However, the screw holes 40j have the same shapes as those of the screw holes 21j shown in FIG. 3.

On the horizontal portion of the first plane parts 40c of the framework 40, there are formed burring holes 40h for fastening the heating coil unit 25 and the like with screws.

As shown in FIG. 10, the upper part of the framework 40 has an approximately rectangular opening portion 40i. Inside the framework 40, there are housed members of a second heating coil unit 42 and a circuit substrate 44 together with the first heating coil unit 25 of the same configuration as that of the heating coil unit 25 of the above-mentioned first embodiment. On the circuit substrate 44, circuit components of the drive control circuit (including the power supply circuit) and the like for making the first heating coil unit 25 and the second heating coil unit 42 generate high-frequency currents are installed. The first heating coil unit 25 has a configuration similar to the configuration of the heating coil unit 25 shown in FIG. 5, and a shape of the second heating coil unit 42 is smaller than the shape of the first heating coil unit 25. This is because the diameter of second heating coil 42a that configures the second heating coil unit 42 is smaller than the diameter of the heating coil 29 which configures the heating coil unit 25, and because the output electric power is small.

The first heating coil unit 25 is fixed to the first plane parts 40c, by fastening screws 45a that pierce through the coil installation parts 33b to the burring holes 40h provided on the first plane parts 40c of the framework 40, as shown in FIG. 5.

The second heating coil unit 42 is configured such that coil installation plates 43 as heating coil unit supporting members are installed on the first plane parts 40c of the framework 40, and that the second heating coil unit 42 is supported by the first plane parts 40c via the coil installation plates 43, as shown in FIG. 10. The coil installation plates 43 are members that support the second heating coil unit 42, and are also called heating coil unit supporting members. Further, the circuit substrate 44 is configured to be fixed to the bottom surface 40a of the framework 40 by fastening screws 45b.

As shown in FIGS. 11 and 12, the coil installation plates 43 (heating coil unit supporting members) are configured to have installation parts 43a of which the lower surfaces are brought into contact with the first plane parts 40c of the framework 40, and coil supporting parts 43b on which second coil installation parts 42b as the coil installation parts of the second heating coil unit 42 are placed. The installation parts 43a and the coil supporting parts 43b are formed to have a step in the upper and lower direction (a vertical direction). The second coil installation parts 42b of the second heating coil unit 42 are formed with screws 42c, and the coil supporting parts 43b of the coil installation plates 43 are provided with screw fastening parts 43d of a cylindrical shape protruded downward. The lower surfaces of the installation parts 43a of the coil installation plates 43 and the upper surfaces of the coil supporting parts 43b are configured to have the same height in the vertical direction when installed on the first plane parts 40c of the framework 40.

The installation parts 43a of the coil installation plates 43 are placed on the first plane parts 40c, and screws 45e that have pierced through screw holes 43c are fastened to buffing holes 40h provided on the first plane parts 40c, so that the coil installation plates 43 are fixed to the framework 40. On the other hand, the second coil installation parts 42b of the second heating coil unit 42 are placed on the coil supporting parts 43b, and screws 45d that have pierced through the second coil installation parts 42b are fastened to the screw fastening parts 43d, so that the second heating coil unit 42 is fixed to the coil installation plates 43. As a result, the second heating coil unit 42 is fixed to the first plane parts 40c of the framework 40 via the coil installation plates 43.

Work and effects of the induction heating cooking device according to the second embodiment configured as described above will be described below.

In the second embodiment, the lower surfaces of the installation parts 43a of the coil installation plates 43 as the heating coil unit supporting members and the upper surfaces of the coil supporting parts 43b are in the same height in the vertical direction. Therefore, in the state that the coil installation plates 43 are installed on the first plane parts 40c, the first plane parts 40c of the framework 40 and the upper surfaces of the coil supporting parts 43b are in the same height.

The first plane parts 40c and the upper surfaces of the coil supporting part 43b are not necessarily required to be configured to have the same height, and the heights can be suitably changed. By changing the shapes of the coil installation plates 43 in this way, that is, by suitably setting the heights of the lower surfaces of the installation parts 43a and the upper surfaces of the coil supporting parts 43b, a distance between the second heating coil unit 42 and the top plate 41 can be adjusted to a necessary distance.

As described above, in the configuration of the second embodiment, although the first heating coil unit 25 and the second heating coil unit 42 have different shapes, the second heating coil unit 42 can be securely installed by being placed on the first plane parts 40c via the coil installation plates 43.

As described above, in the second embodiment, there are provided the coil installation plates 43 as the heating coil unit supporting members that support the second heating coil unit 42. Therefore, the heating coil unit supporting members are supported by the first plane parts 40c of the framework 40, and the second heating coil unit 42 is configured to be supported by the first plane part 40c with the heating coil unit supporting members. As described above, the heating coil unit of a shape that cannot be directly installed as it is on the first plane parts can be installed at a desired position, by making the heating coil unit to be securely supported on the first plane parts 40c as horizontal portions, with the heating coil unit supporting members (coil installation plates 43).

In the induction heating cooking device according to the second embodiment, the description has been made about the configuration that a plurality of heating coil units of different shapes are mounted by installing the coil installation plates 43 on the first plane parts 40c provided on the side surfaces of the framework 40. However, the present disclosure is not limited to only this configuration. For example, it is also possible to provide a configuration of mounting a plurality of heating coil units (25) of the same shape without using the coil installation plates (43), and a configuration of assembling by using the coil installation plates (43) as the heating coil unit supporting members to all of a plurality of heating coil units (42). Therefore, by using the configuration of the second embodiment, in the induction heating cooking device having the framework (40) of the same shape, a plurality of machine types having various heating coil units (25, 42) of different shapes can be configured, and the framework can be shared.

Further, in a type of the induction heating cooking device on which only one heating coil unit is mounted, the product can be easily assembled without changing the shape of the framework, by only changing the coil installation plates as the heating coil unit supporting members.

While the framework necessitates a large investment to manufacture the framework with a large mold, the heating coil unit supporting members (the coil installation plates 43) are compact and can be manufactured at low cost. Therefore, by manufacturing the heating coil unit supporting members of different shapes, the heating coil units of different shapes can be mounted on the same framework. Therefore, according to the second embodiment, the degree of freedom of designing the heating coil unit becomes high, and various kinds of products can be provided at low cost.

Further, in the second embodiment, although the description has been made about the configuration in which the two heating coil units are disposed in the front and rear direction, the present disclosure is not limited to the configuration in which the two heating coil units are disposed in the front and rear directions. For example, two or more heating coil units may be disposed in the right and left direction, and three or more heating coil units can be also disposed in the front and rear direction.

Further, in mounting a plurality of heating coil units, a product in which three or more heating coil units is less convenient from the aspect of easiness of handling when disposed in the front and rear direction. However, when the heating coil units are disposed in the lateral direction, three or more heating coil units are not inconvenient, and usable products can be provided in an easy-to-assemble configuration.

Third Embodiment

Figure 13:
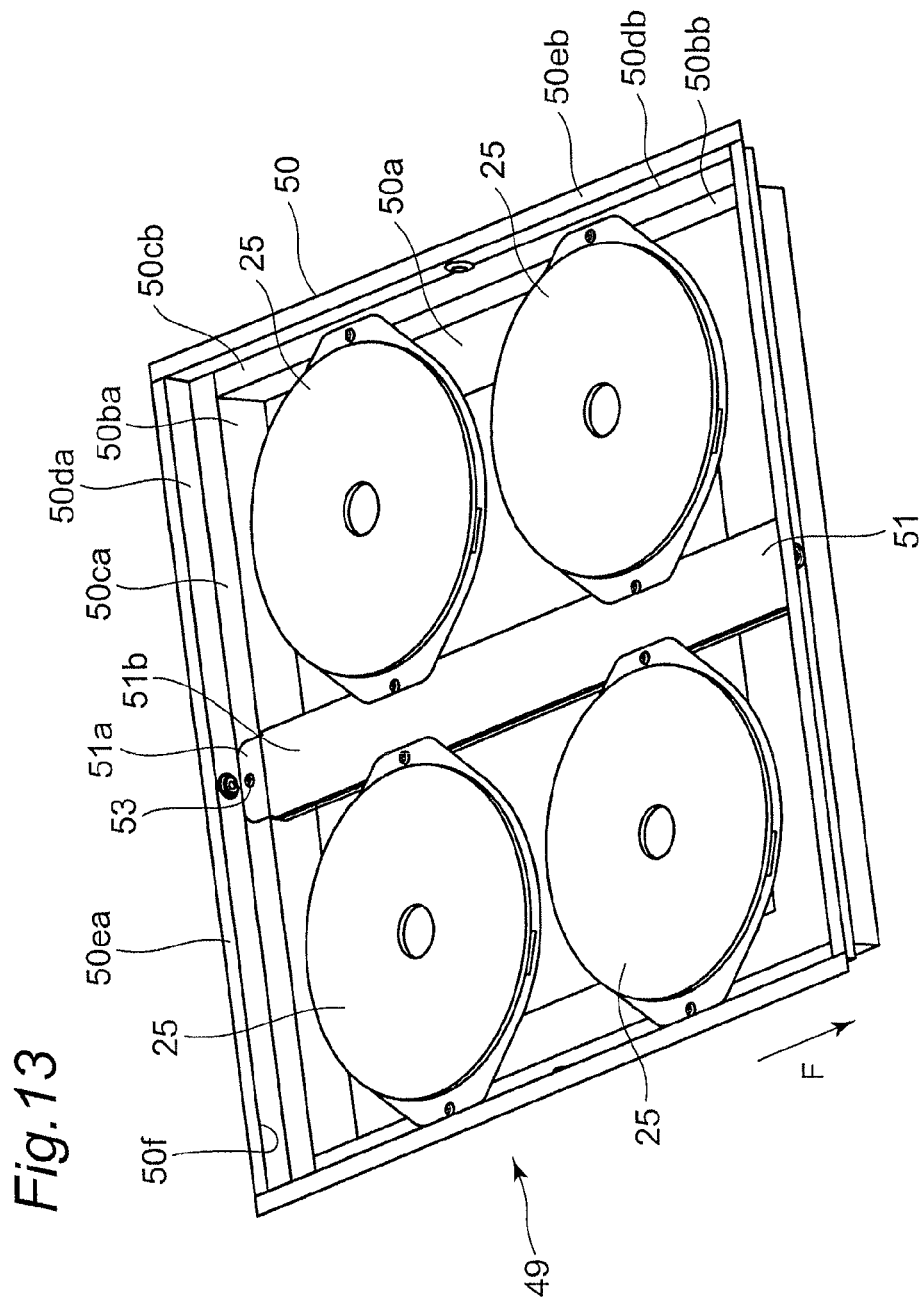
FIG. 13 is a perspective view looked at from above of a state that the top plate unit is detached from an induction heating cooking device according to a third embodiment of the present disclosure.
Figure 14:
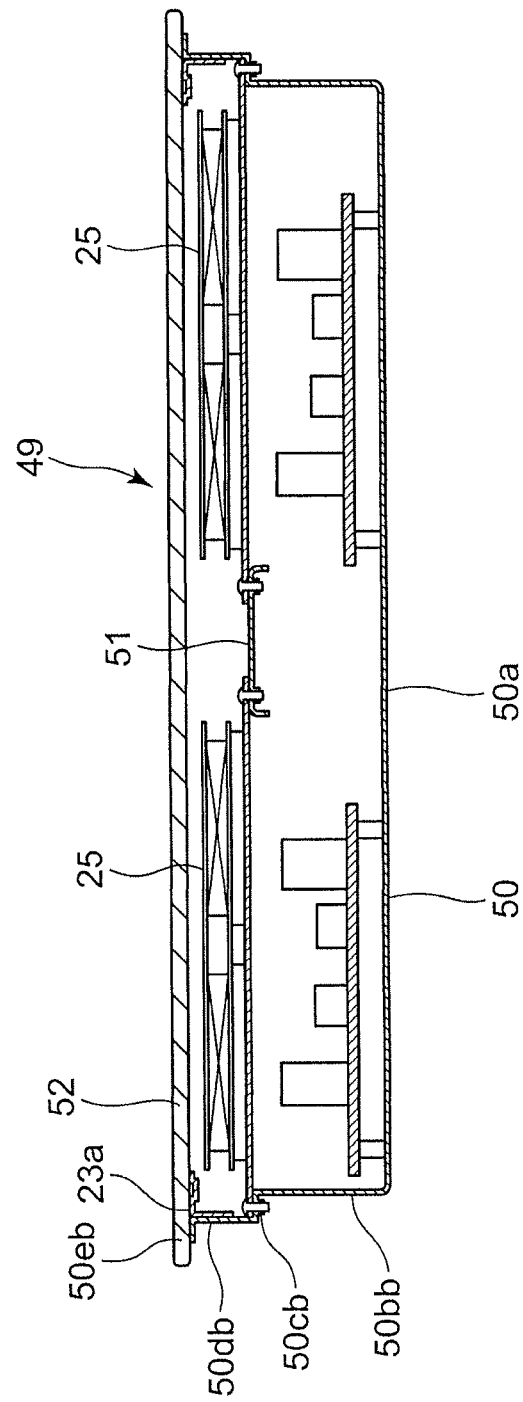
FIG. 14 is a side sectional view showing the induction heating cooking device according to the third embodiment.

Next, an induction heating cooking device according to a third embodiment of the present disclosure will be described with reference to appended FIGS. 13 and 14. FIG. 13 is a perspective view looked at from above of the state that the top plate unit is detached from the induction heating cooking device according to the third embodiment of the present disclosure. FIG. 14 is a side sectional view showing the induction heating cooking device according to the third embodiment.

In the following description of the third embodiment, because the basic configuration of the third embodiment is similar to the configuration of the above-mentioned first embodiment, description of similar points will not be repeated, and different points will be mainly described. Further, in the third embodiment, components that have functions and configurations similar to those of the first embodiment will be attached with the same symbols. A cooling configuration including the fan can be configured similarly to the first embodiment, and a corresponding drawing will not be presented. In FIG. 13, the arrow F indicates the front (a user side).

As shown in FIGS. 13 and 14, a main body 49 as the induction heating cooking device according to the third embodiment has a bottom surface 50a of an approximately rectangular shape, and includes a framework 50 of a box shape on the upper surface of which an opening portion 50f of an approximately rectangular shape is formed, and a top plate 52 that is provided on the framework 50.

The framework 50 is bent upward (in the vertical direction) at the outer edge parts of the bottom surface 50a of an approximately rectangular shape, and is formed with first longitudinal walls 50ba as first vertical parts which are extended to the right and left direction and first longitudinal walls 50bb as first vertical parts which are extended to the front and rear direction, both vertical parts having vertical surfaces. The framework 50 is bent at the upper edge parts of the first longitudinal walls 50ba and the first longitudinal walls 50bb to spread to an outer side, and is formed with first plane parts 50ca and first plane parts 50cb as first horizontal parts, both plane parts having horizontal surfaces. The first plane parts 50ca are provided on front and rear side surfaces of the framework 50, and are formed to extend in slender to the right and left direction of the opening portion 50f, that is in the longitudinal direction. On the other hand, the first plane parts 50cb are provided on right and left side surfaces of the framework 50, and are formed to extend in slender to the front and rear direction of the opening portion 50f, that is, in the lateral direction. Further, the framework 50 is bent upward (in the vertical direction) at respective outer edge parts of the first plane parts 50ca and the first plane parts 50cb, and is formed with second longitudinal walls 50da and second longitudinal walls 50db as second vertical parts having vertical surfaces. Further, the framework 50 is bent at the upper edge parts of the second longitudinal walls 50da and the second longitudinal walls 50db to spread to an outer side, and is formed with second plane parts 50ea and second plane parts 50eb as second horizontal parts, both plane parts having horizontal surfaces.

On the first plane parts 50ca provided on the side surfaces at both front and rear sides of the framework 50, a joint member 51 is hung and fastened with screws to stride in the front and rear direction. In the induction heating cooking device according to the third embodiment, as shown in FIG. 13, a plurality of heating coil units 25 are supported by the joint member 51 and the first plane parts 50cb provided on the side surfaces at both right and left sides of the framework 50.

The joint member 51 is configured by a sheet material in a thickness not deformed to a lower direction by load of a plurality of heating coil units 25 even when the heating coil units 25 are placed on the joint member 51. The joint member 51 also uses a member that is not likely to be easily deformed, by increasing strength against deflection, by forming a downward cross section of the sheet material in approximately a U shape by bending the outer peripheral portions to a lower direction.

The joint member 51 includes installation parts 51a as portions that are placed on the first plane parts 50ca, and coil supporting parts 51b as portions that support the heating coil units 25. The joint member 51 is fixed to the first plane parts 50ca, by fastening screws 53 that pierce through screw hoes (not shown) provided on the installation parts 51a, to buffing holes (not shown) provided on the first plane parts 51ca. A step is provided between the installation parts 51a and the coil supporting parts 51b. The heights of the step in the upper and lower direction are set the same as the thickness of the installation parts 51a. In this way, the upper surfaces of the coil supporting parts 51b are set one step lower than the upper surfaces of the installation parts 51a so that the lower surfaces of the installation parts 51a and the upper surfaces of the coil supporting parts 51b become in the same height.

Work and effects of the induction heating cooking device according to the third embodiment configured as described above will be described below.

In the third embodiment, in the state that the joint member 51 is installed on the first plane parts 50ca at both front and rear sides of the framework 50, horizontal portions of the first plane parts 50ca and the upper surfaces of the coil supporting parts 51b are in the same height. The heights of the first plane parts 50ca provided at both right and left sides of the framework 50 and the heights of the first plane parts 50cb provided at both front and rear sides are formed the same. Therefore, each of the plurality of heating coil units 25 is held horizontally.

As described above, the induction heating cooking device according to the third embodiment has the joint member 51 of which both end portions (the installation parts 51a) are mounted and fixed by striding to the two first plane parts 50ca which are parallel and face each other in the framework 50. Further, the heating coil units 25 are configured to be securely supported horizontally on the first plane parts 50ca via the joint member 51. Therefore, in the induction heating cooking device according to the third embodiment, the framework 50 is configured to be able to securely support a plurality of heating coil units 25 by utilizing the first plane parts 50ca that are orthogonal with the first plane parts 50cb by not only utilizing the first plane parts 50cb that are mutually parallel at both right and left sides of the framework 50. In order to match sizes and specifications of the product, by providing a plurality of joint members, the heating coil units 25 may be placed on the plurality of joint members.

In the induction heating cooking device according to the third embodiment, because the plurality of heating coil units 25 are configured to be disposed inside the framework 50, the bottom surface 50a of the framework 50 becomes large. When the bottom surface 50a of the framework 50 becomes large, the bottom surface 50a which is formed by a thin metal sheet (0.5 mm, for example) is likely to be easily warped to the lower direction. However, the first plane parts 50ca as the side surfaces of the framework 50 are formed between the first longitudinal walls 50ba and the second longitudinal walls 50da as the vertical portions that are not likely to be easily deformed to the upper and lower direction, and the first plane parts 50ca are configured to be held by the first longitudinal walls 50ba and the second longitudinal walls 50da. Therefore, the horizontal portions of the first plane parts 50ca on the side surfaces of the framework 50 have a structure that do not easily move to the upper and lower direction. Further, the strength of the joint member 51 can be easily increased by forming the joint member 51 in a shape having strength that does not cause the heating coil units 25 to be deformed to the lower direction by the own weight, by bending the edge portions to the lower direction to have the cross section in a U shape, for example.

As described above, in the induction heating cooking device according to the third embodiment, because the heating coil units 25 are configured to be supported by the first plane parts 50ca, the first plane part 50cb, and the joint member 51 that are not likely to be easily deformed to the lower direction, the distance between the heating coil units 25 and the top plate 52 can be stabilized. Further, in the induction heating cooking device according to the third embodiment, by installing the plurality of heating coil units 25 on the first plane parts 50cb at both right and left sides and on the joint member 51 in the framework 50, the plurality of heating coil units 25 are configured to be securely held horizontally and at positions of the same height. Therefore, the distance between the top plate 52 and each heating coil unit 25 placed on the framework 50 can be held constant, and also the performance of induction heating that is a target of each heating coil unit 25 can be stably secured.

Fourth Embodiment 4

Figure 15:
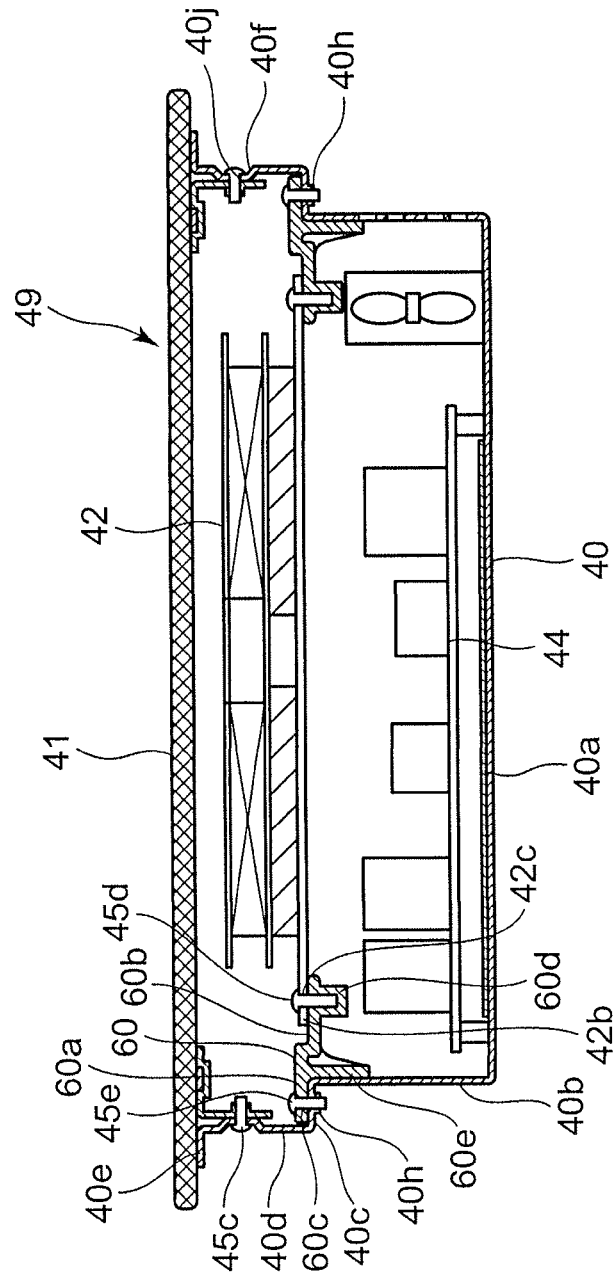
FIG. 15 is a side sectional view showing an induction heating cooking device according to a fourth embodiment of the present disclosure.

Next, an induction heating cooking device according to a fourth embodiment of the present disclosure will be described with reference to appended FIG. 15. FIG. 15 is a side sectional view showing the induction heating cooking device according to the fourth embodiment of the present disclosure.

In the following description of the fourth embodiment, because the basic configuration of the fourth embodiment is similar to the configuration of the above-mentioned second embodiment, description of similar points will not be repeated, and different points will be mainly described. Further, in the fourth embodiment, components that have functions and configurations similar to those of the first embodiment and the second embodiment will be attached with the same symbols.

As shown in FIG. 15, in the induction heating cooking device according to the fourth embodiment, coil installation plates 60 by which the second heating coil unit 42 having a small heating coil is installed on the framework 40 is configured such that the lower surfaces of installation parts 60a and the upper surfaces of coil supporting parts 60b become in the same height. Therefore, in the state that the coil installation plates 60 are installed on the first plane parts 40c on the side surfaces of the framework 40, the horizontal portions of the first plane parts 40c and the upper surfaces of the coil supporting parts 60b of the coil installation plates 60 are in the same height. The installation parts 60a of the coil installation plates 60 are provided with screw holes 60*c*, and the coil supporting parts 60*b* are provided with screw fastening parts 60*d*.

On the coil installation plates 60 of the induction heating cooking device according to the fourth embodiment, reinforcement longitudinal walls 60*e* are formed to protrude downward (the vertical direction). The reinforcement longitudinal walls 60*e* are disposed in contact with the inner surfaces of the first longitudinal walls 40*b* configured by vertical portions of the framework 40.

The installation parts 60*a* of the coil installation plates 60 are placed on the first plane parts 40*c*, and screws 45*e* that have pierced through screw holes 60*c* are fastened to burring holes 40*h* provided on the first plane parts 40*c*, so that the coil installation plates 60 are fixed to the first plane parts 40*c*. Further, the second coil installation parts 42*b* of the second heating coil unit 42 are placed on the coil supporting parts 60*b* of the coil installation plates 60, and the screws 45*d* that have pierced through screw holes 42*c* provided on the second coil installation parts 42*b* are fastened to the screw fastening parts 60*d* provided on the coil supporting parts 60*b*, so that the second heating coil unit 42 is fixed to coil installation plates 60.

Work and effects of the induction heating cooking device according to the fourth embodiment configured as described above will be described below.

In the fourth embodiment, when impact in the lower direction is applied to the whole of the main body 49 as the induction heating cooking device, the coil supporting parts 60*b* of the coil installation plates 60 receive pressing force due to the own weight of the second heating coil units 42. At this time, because the coil installation plates 60 are fixed to the first plane parts 40*c* provided on the side surface of the framework 40, pressing force to the lower direction is applied to the coil installation plates 60, using the surfaces in contact with the first plane parts 40*c*, as supporting surfaces. At this time, because the reinforcement longitudinal walls 60*e* provided on the coil installation plates 60 are in contact with the vertical portions of the first longitudinal walls 40*b*, downward deflection (movement) of the coil supporting parts 60*b* of the coil installation plate 60 is prevented. As a result, the second heating coil unit 42 is prevented from moving to the lower direction, and a variation in the distance between the top plate 41 and the second heating coil unit 42 can be prevented.

As described above, in the fourth embodiment, the coil installation plates 60 as the heating coil unit supporting members are configured to have the reinforcement longitudinal walls 60*e* that are in contact with the inner surfaces of the first longitudinal walls 40*b* provided on the vertical portions of the framework 40 and that are formed to protrude to the lower direction. Therefore, the coil installation plates 60 as the heating coil unit supporting members have high strength, and are configured such that the coil supporting parts 60*b* of the coil installation plates 60 are not likely to be easily bent downward.

As shown in FIG. 10, in the case of installing on the first plane parts 40*c* of the framework 40 the first heating coil unit 25 that does not use the coil installation plate as the heating coil unit supporting member, even when load in the lower direction is applied to the first heating coil unit 25, because the coil installation parts 33*b* of the shield plate 33 are directly installed on the first plane parts 40*c*, deflection of the shield plate 33 is prevented. Further, as described in the following embodiment, rigidity of the shield plate 33 can be increased by bending the outer peripheral portion of the shield plate 33 or by providing beads on the bottom surface of the shield plate 33. Further, for the shield plate 33, there is used a non-magnetic metal such as aluminum having a large thickness of 1.5 mm, for example, to increase rigidity. Further, each first plane part 40*c* on which the coil installation part 33*b* of the shield plate 33 is installed is formed between the first longitudinal wall 40*b* and the second longitudinal wall 40*d* as the vertical portions which configure the side surfaces of the framework 40. The first longitudinal walls 40*b* and the second longitudinal walls 40*d* have structures that are not likely to be deformed by compression and pressurizing to the vertical direction.

On the other hand, in the configuration of using an extension member that the second heating coil unit 42 is installed on the first plane parts 40*c* via the coil installation plates 60 as the heating coil unit supporting members, in the case where load has been applied to the second heating coil unit 42, the coil installation plates 60 are likely to be easily deformed (turned) to the lower direction. However, because the reinforcement longitudinal walls 60*e* are provided on the coil installation plates 60, the configuration is provided that the turning of the coil installation plates 60 is prevented. As a result, when the second heating coil unit 42 is installed on the framework 40 by using the coil installation plates 60, movement of the second heating coil unit 42 can be also prevented.

Fifth Embodiment

Figure 16:
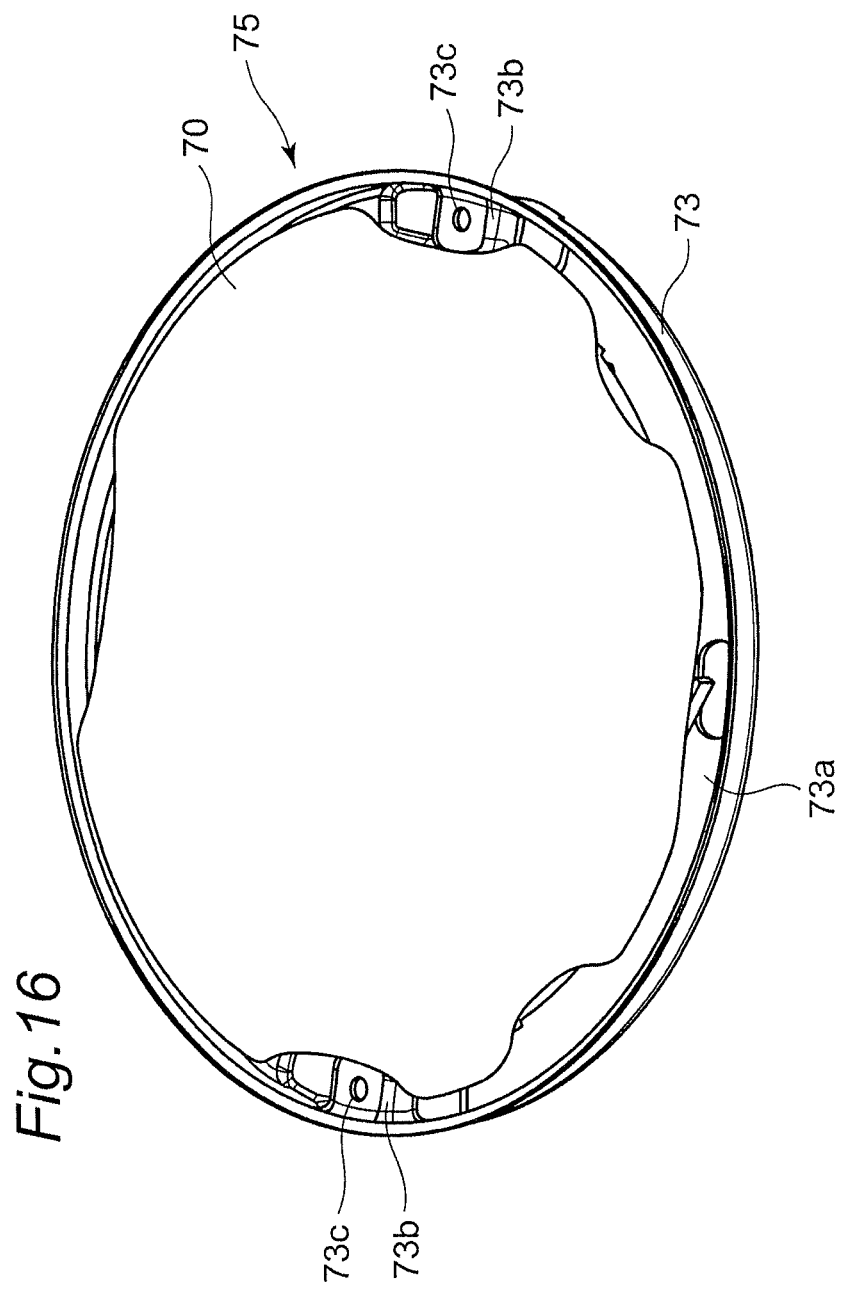
FIG. 16 is a perspective view showing a heating coil unit of an induction heating cooking device according to a fifth embodiment of the present disclosure.
Figure 17:
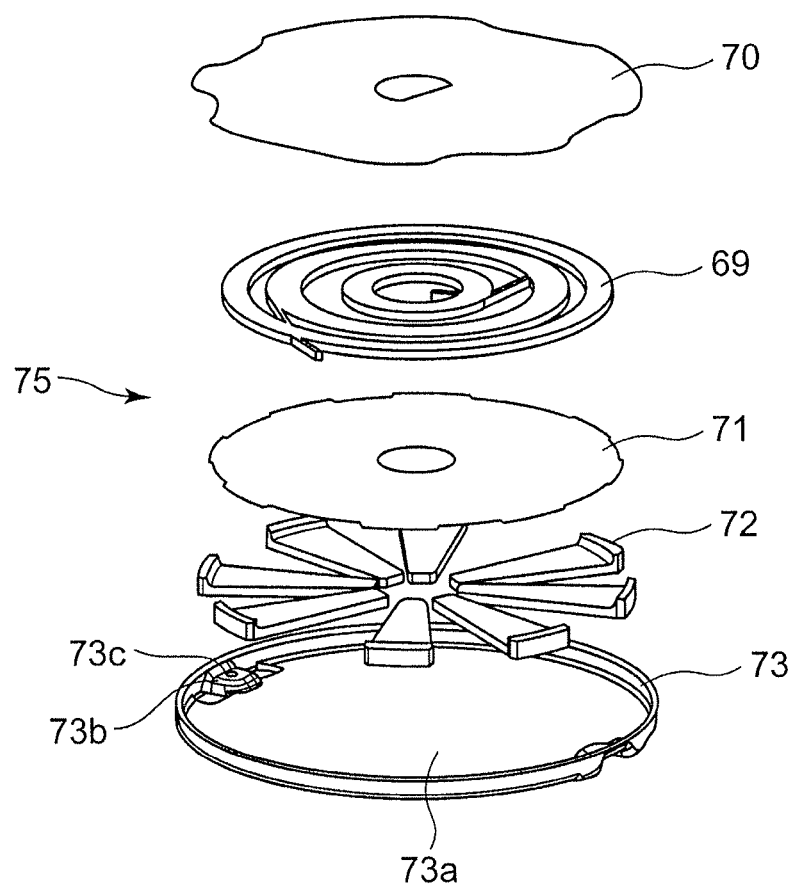
FIG. 17 is an exploded perspective view of the heating coil unit of the induction heating cooking device according to the fifth embodiment.
Figure 18:
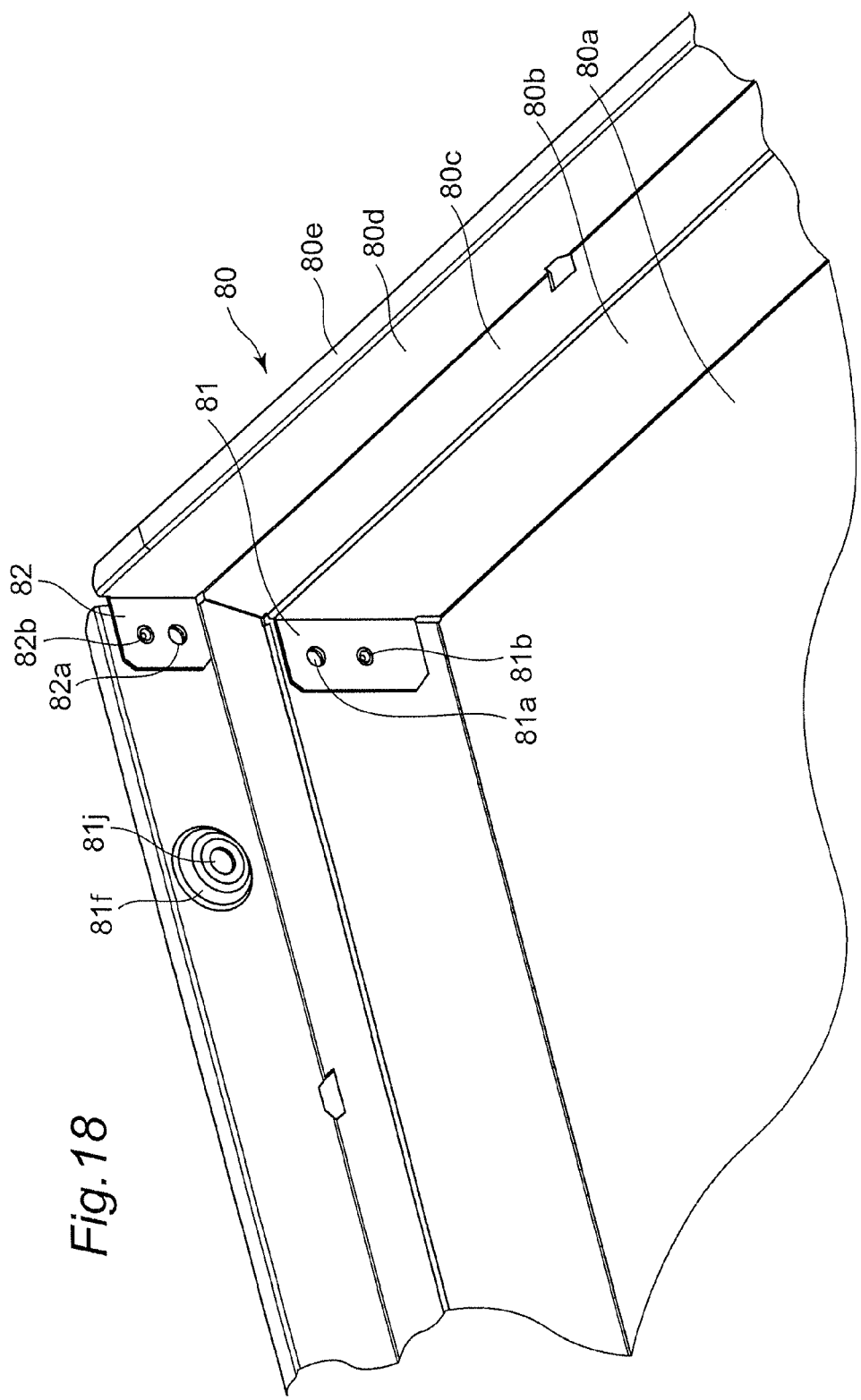
FIG. 18 is a perspective view showing an assembly state of the framework of the induction heating cooking device according to the fifth embodiment.

Next, an induction heating cooking device according to a fifth embodiment of the present disclosure will be described with reference to appended FIGS. 16 to 18. FIG. 16 is a perspective view showing the heating coil unit of the induction heating cooking device according to the fifth embodiment of the present disclosure. FIG. 17 is an exploded perspective view of the heating coil unit of the induction heating cooking device according to the fifth embodiment. FIG. 18 is a perspective view showing an assembly state of the framework of the induction heating cooking device according to the fifth embodiment.

In the following description of the fifth embodiment, because the basic configuration of the fifth embodiment is similar to the configuration of the above-mentioned first embodiment, description of similar points will not be repeated, and different points will be mainly described. Further, in the fifth embodiment, components that have functions and configurations similar to those of the first embodiment will be attached with the same symbols.

The induction heating cooking device according to the fifth embodiment is for describing a detailed configuration example of the heating coil unit and the framework in the first embodiment to the fourth embodiment.

A heating coil unit 75 according to the fifth embodiment shown in FIGS. 16 and 17 corresponds to the heating coil unit 25 described with reference to FIG. 5 in the above-mentioned first embodiment.

The heating coil unit 75 shown in FIG. 16 is obtained by having each configuration component adhered to each other with an adhesive or the like, stacked on and fixed to a shield plate 73, and integrated together. In FIG. 17, the heating coil unit 75 includes a heating coil 69, a heat shield plate 70 that is placed at an upper side of the heating coil 69 and shields heat from the cooking container, an insulating plate 71 having an electric insulation property provided at a lower surface side of the heating coil 69, a ferrite 72 provided below the insulating plate 71 and molded in a shape of a plurality of bars having high permeability with a high magnetic flux absorption effect, and the shield plate 73 on which the ferrite 72 is placed and which is installed on a framework 80 (see FIG. 18).

The heating coil 69 in the fifth embodiment will be described using a heating coil having an approximately circle shape in the outer peripheral shape, as an exemplification. The shield plate 73 according to the fifth embodiment has an edge part of which the outer peripheral portion is erected to surround a plurality of ferrites 72 that are disposed radially. In the shield plate 73 according to the fifth embodiment, a coil installation part 73b is provided at an inner side of the outer peripheral part. On the coil installation part 73b, a screw hole 73c for installing a first plane part 80c (see FIG. 18) as a first horizontal part of the framework 80 is formed. In the fifth embodiment, because the coil installation part 73b is provided at an inner side of the outer peripheral part of the shield plate 73, the framework shape can be made compact, and heating coil units having different shapes can be used by having the same framework shapes by changing shapes of the shield plates.

As described above, because the shield plate 73 according to the fifth embodiment has an erected edge part at the outer peripheral portion, the shield plate 73 has high rigidity. As a result, the shield plate 73 is prevented from being deflected in the state that the heating coil unit 75 is installed on the framework 80. As a result, in the induction heating cooking device according to the fifth embodiment, a distance between the top plate and the heating coil unit 75 can be maintained always constant.

FIG. 18 is a perspective view showing an assembled state of the framework 80 according to the fifth embodiment, and shows an enlarged side surface that is bent at the right angle in the framework 80. The framework 80 according to the fifth embodiment has a configuration similar to that of the framework 21 described in the above-mentioned first embodiment, and includes a bottom surface 80a of an approximately rectangular shape. The framework 80 has side surfaces configured by first longitudinal walls 80b as first vertical parts, first plane parts 80c as first horizontal parts, second longitudinal walls 80d as second vertical parts, and second plane parts 80e as second horizontal parts. Further, the side surface of the framework 80 shown in FIG. 18 shows a concave part 81f and a screw hole 81j for installing to the frame on the top plate unit.

In the fifth embodiment, as shown in FIG. 18, a side surface portion of the framework 80 that is bent at approximately the right angle is spot welded at welding parts 81b and 82b of joining portions 81 and 82, and higher strength of the side surface portion of the framework 80 is secured. At one end part in the longitudinal direction of the first longitudinal walls 80b, there is provided the joining part 81 for joining the adjacent first longitudinal wall at approximately the right angle. Similarly, at one end part in the longitudinal direction of the second longitudinal walls 80d, there is provided the joining part 82 for joining the adjacent second longitudinal wall at approximately the right angle. Positioning holes 81a and 82a for positioning are provided at the respective joining portions 81 and 82. The framework 80 is assembled by inserting positioning pins into through-holes (not shown) provided at corresponding positions of the longitudinal walls opposite to the positioning holes 81a and 82a, and by spot welding the welding parts 81b and 82b. In this way, in the fifth embodiment, the framework 80 of a predetermined shape having strength is configured to be easily assembled.

The configurations of the heating coil unit and the framework described in the fifth embodiment can be also applied to other embodiments of the present disclosure, and further work and effects can be added to each embodiment.

Sixth Embodiment

Figure 19:
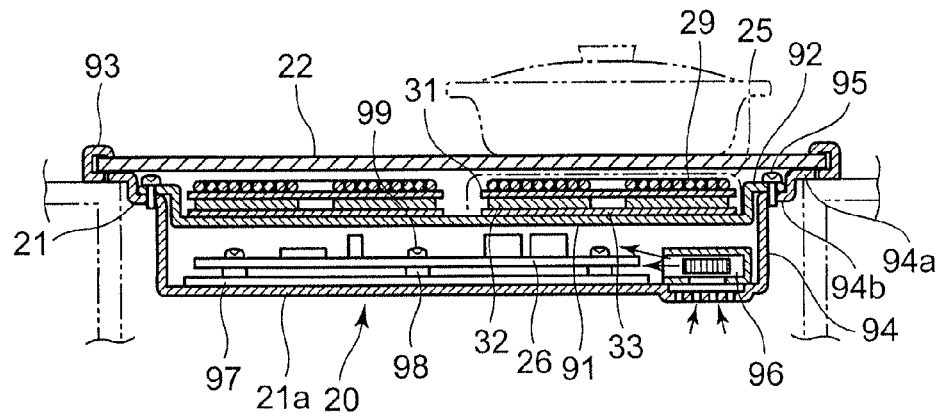
FIG. 19 is a side sectional view showing a state that an induction heating cooking device according to a sixth embodiment of the disclosure is built in the kitchen.
Figure 20:
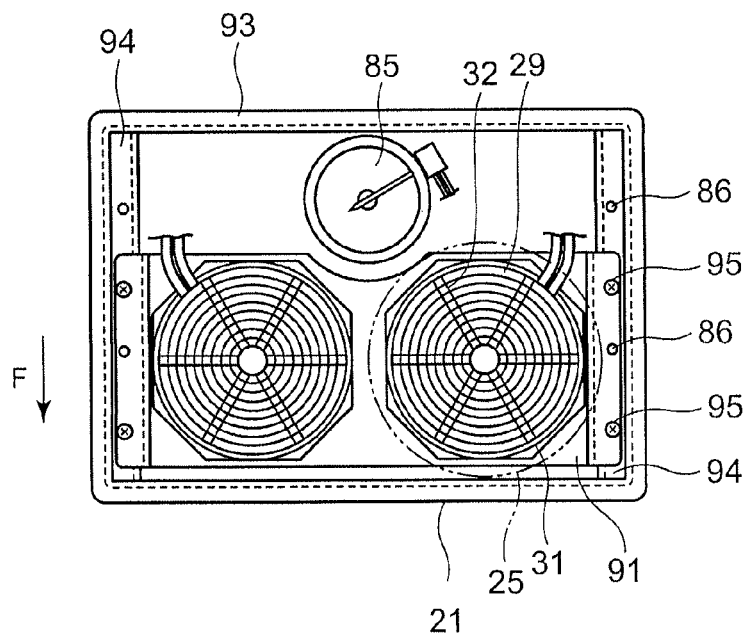
FIG. 20 is a plan view showing a state that a top plate is detached in the induction heating cooking device according to the sixth embodiment.

Next, an induction heating cooking device according to a sixth embodiment of the present disclosure will be described with reference to appended FIGS. 19 and 20. FIG. 19 is a side sectional view showing a state that the main body as the induction heating cooking device according to the sixth embodiment of the disclosure is built in the kitchen. FIG. 20 is a plan view showing the main body in the state that the top plate is detached in the induction heating cooking device according to the sixth embodiment.

Further, in the description of the sixth embodiment, components that have functions and configurations similar to those of the above-mentioned first embodiment will be attached with the same symbols, and different points will be mainly described.

As shown in FIG. 19, above the framework 21 of the main body 20 as the induction heating cooking device according to the sixth embodiment, there is disposed the top plate 22 for placing an object to be heated such as a cooking pan, to cover the upper opening of the framework 21. The top plate 22 is configured by a material that is not heated by electromagnetic induction, such as high heat-resistant crystallized glass. The outer periphery of the top plate 22 is installed with a frame 93 for protecting the end surface of the top plate 22 and for improving the outer appearance. On side surface walls 94 of the framework 21, there are configured first step parts 94a for placing the top plate 22, and second step parts 94b for holding the end parts of a heating coil supporting member 91 to be described later. Below the top plate 22, and inside the framework 21, the heating coils 29 and the circuit substrate 26 are disposed. By supplying high-frequency electric power from the circuit substrate 26 to the heating coils 29, the cooking tool to be heated as the object to be heated is directly heated. Because the principle and the like of induction heating are well known, relevant description will not be presented.

A heating component by the power supply circuit and the like in the circuit substrate 26 is cooled by cooling air transmitted by a cooling mechanism including a fan 96 that is provided inside the framework 21.

Further, below the heating coils 29, there are disposed the ferrites 32 for controlling a magnetic flux generated by the heating coils 29 to become in an optimum distribution to heat the cooking device to be heated. Between each heating coil 29 and each ferrite 32, there is provided the insulating plate 31 made of an insulating material such as mica to keep insulation between the heating coil 29 and the ferrite 32. Further, below the ferrites 32, the shield plate 33 made of a non-magnetic metal such as aluminum is provided, to prevent erroneous heating of members made of a magnetic metal which is closely adjacent to the heating coils 29 and to shield noise and the like that are generated from the heating coils 29.

The heating coil units 25 are configured by the heating coils 29, the insulating plates 31, the ferrites 32, and the shield plates 33. In the present disclosure, the configuration of the heating coil units 25 may not be the same as the configuration of the sixth embodiment so far as the above work effect is obtained, and is not limited to the sixth embodiment.

The heating coil units 25 including the heating coils 29 are placed on the heating coil supporting member 91 of an approximately planar shape, and is supported from below.

End parts 92 of the heating coil supporting member 91 are held in the state of being bridged to the second step parts 94b of right and left side surface walls 94 of the framework 21 of an approximately box shape of which almost all of the upper surface is opened. Further, the end parts 92 of the heating coil supporting member 91 are fastened to second step parts 94b of the framework 21 with screws 95. Rigidity of the heating coil supporting member 91 is improved by bending the edges of the heating coil supporting member 91 upward and laterally.

The operation and the work of the induction heating cooking device according to the sixth embodiment as a built-in heating cooking device configured as described above will be described below.

The heating coil units 25 including the heating coils 29 are supported by being placed on the heating coil supporting member 91 of an approximately planar shape. Vicinities of the end parts 92 of the heating coil supporting member 91 are held by being bridged to the side surface walls 94 that are not likely to be easily deformed by load in the upper and lower direction out of the framework 21 of the main body 20. Because the heating coil units 25 are configured to be held by the framework 21 in this way, deformation of the framework 21 due to the weight of the heating coil units 25 and the like can be reduced. Further, because positions of the heating coils 29 are stabilized by the configuration of the heating coils 29, springs that support the heating coil units 25 and position restricting members that restrict the positions against the biasing force of the springs become unnecessary, and the number of components can be substantially reduced. Therefore, in the induction heating cooking device of the sixth embodiment, simplification of the configuration can be achieved. Further, because load of heavy goods such as the circuit substrate 26 is not applied to the heating coil supporting member 91, deflection can be suppressed. Because the heating coil supporting member 91 is sufficient enough to support only the heating coil units and because the weight is small, in the present embodiment, the two heating coil units 25 are placed on one heating coil supporting member 91.

A gap size in the upper and lower direction (the vertical direction) between the bottom surface 21a of the framework 21 and the heating coil supporting member 91 is set larger than a maximum height size of the circuit substrate 26 having the power supply circuit, and the circuit substrate 26 is laid out in this space. The circuit substrate 26 is fixed by fastening screws 99 to bosses 98 of a substrate holder 97 placed on the bottom surface 21a of the framework 21.

In the configuration of the sixth embodiment, because members for supporting the heating coil units 25 and installation structures of the members are not necessary on the bottom surface 21a of the framework 21, there is no waste in the wiring routing structure and the like between the circuit substrate 26 and the heating coil units 25. Accordingly, the external shape of the circuit substrate 26 can be also configured smaller.

Further, in the space below the heating coil supporting member 91 that supports the heating coil units 25, there is no pillar or the like that supports the heating coil units 25 and the like, and a large space is secured in the horizontal direction. Therefore, in the configuration of the sixth embodiment, a plurality of circuit substrates including the substrate of the power supply circuit can be disposed by arranging the circuit substrates in approximately the horizontal direction, and the main body 20 can be thinned. Further, in the configuration of the sixth embodiment, integrating a plurality of circuit substrates to construct one circuit substrate becomes easy, and wires that connect between the circuit substrates become unnecessary. Therefore, in the induction heating cooking device of the sixth embodiment, reliability can be improved by reducing assembly man-hours and component cost and by reducing connection positions of wires.

As shown in FIG. 20, in the induction heating cooking device according to the sixth embodiment, spare installation holes 86 are provided on the side surface walls 94 of the framework 21 so that a position in the front and rear direction of the heating coil supporting member 91 can be moved by a predetermined distance. The heating coil supporting member 91 is provided with the spare installation holes 86 so that the heating coil supporting member 91 can be fixed to the side surface walls 94 of the framework 21 with the screws 95 in the state that the position in the front and rear direction is moved by a predetermined distance. Because the spare installation holes 86 are provided on the side surface walls 94 of the framework 21 in this way, the heating coil units 25 placed on the heating coil supporting member 91 can be moved to the front and rear direction by the same distance.

Figure 21:
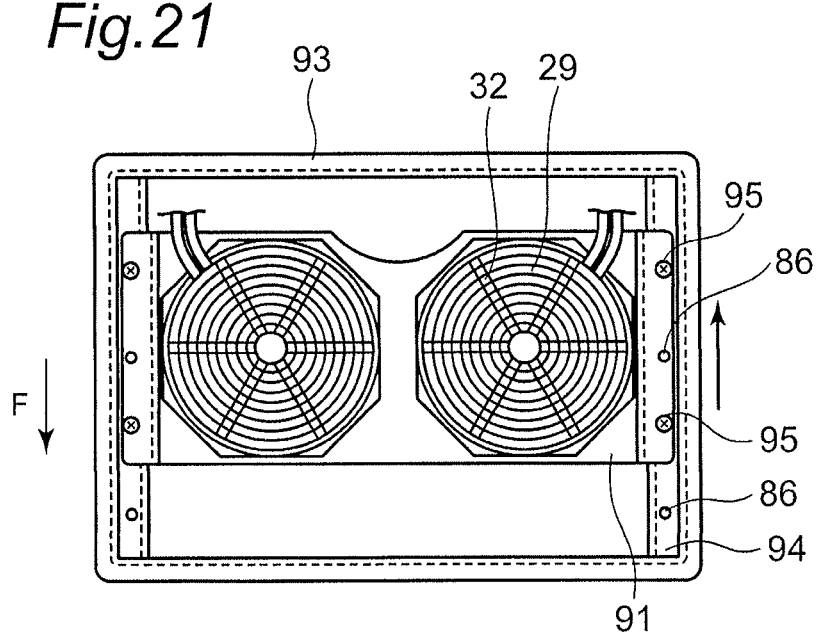
FIG. 21 is a plan view showing a state that the top plate is detached in other configuration of an induction heating cooking device of the present disclosure.

Therefore, the basic specification of the product can be easily changed, by changing the heating coil supporting member 91 to the front and rear direction in the state that the right and left heating coils 29 are placed on the heating coil supporting member 91. For example, in addition to providing an induction heating cooking device that includes total three heaters disposed with two heating coils 29 at the right and left sides and disposed with a radiant heater 85 wound with a nichrome wire in a spiral shape at the rear side as shown in FIG. 20, the product can have a specification of only two heaters at the right and left sides (heating coils 29) by avoiding the heater at the rear side as shown in FIG. 21. FIG. 21 is a plan view showing a main body in the state that the top plate is detached in other configuration of the induction heating cooking device of the present disclosure. As described above, in the configuration according to the sixth embodiment, by only changing the installation position of the heating coil supporting member 91, the heating coils 29 can be disposed at proper positions, and development of a product variation can be easily performed.

Further, in the sixth embodiment, although the description has been made about the configuration that the heating coil supporting member 91 is supported by only the side surface walls 94 of the framework 21, the heating coil supporting member 91 may be supplementarily supported at other positions than the above positions. That is, because the heating coil supporting member 91 is supported by mainly the side surface walls 94, the degree of freedom of selection of a place of supporting at other positions is high, and a similar effect can be obtained.

As installation methods of the heating coil supporting member 91, suitable fastening means such as fastening with screw, fitting by claws, and sandwiching may be set, and these fastening means can be also applied to other embodiments.

A display and operation part may be provided on any of a ceiling surface side and a front surface side of the product, and is not limited in the present disclosure, and therefore, description will not be presented.

Further, the sixth embodiment relates to the mode of only heating the cooking tool to be heated that is placed on the top plate 22, but may additionally include a grill room for performing heat cooking by housing inside an object to be cooked.

Seventh Embodiment

Figure 22:
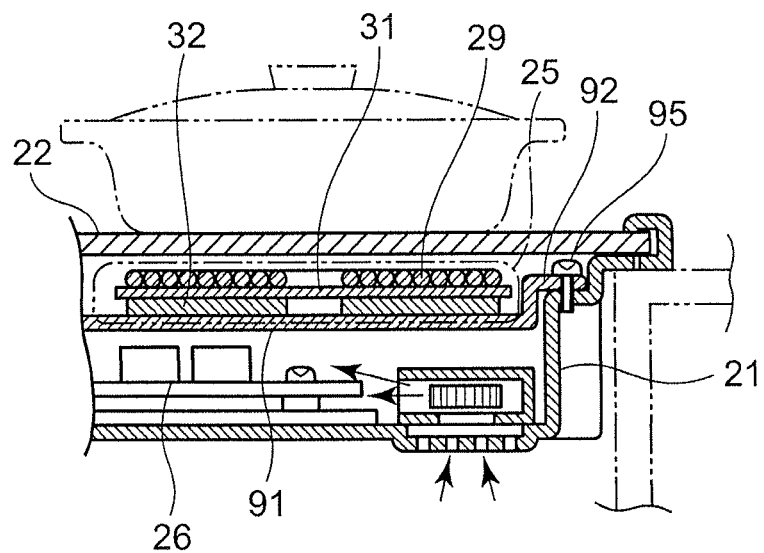
FIG. 22 is a side sectional view showing an induction heating cooking device according to a seventh embodiment of the present disclosure.

Next, an induction heating cooking device according to a seventh embodiment of the present disclosure will be described with reference to appended FIG. 22. FIG. 22 is a side sectional view showing the configuration of the induction heating cooking device according to the seventh embodiment of the present disclosure.

In the following description of the seventh embodiment, because the basic configuration of the seventh embodiment is similar to the configuration of the above-mentioned sixth embodiment, description of similar points will not be repeated, and different points will be mainly described. Further, in the seventh embodiment, components that have functions and configurations similar to those of the sixth embodiment will be attached with the same symbols.

In FIG. 22, the heating coil supporting member 91 is formed by a non-magnetic metal such as aluminum. In the configuration of the induction heating cooking device according to the seventh embodiment, because the heating coil supporting member 91 is formed by the non-magnetic metal, the heating coil supporting member 91 can also work as the shield plate in the above-mentioned sixth embodiment. Therefore, in the induction heating cooking device according to the seventh embodiment, a shield plate becomes unnecessary, and a lower space of the heating coil units 25 can become small by this portion, and the number of components can be decreased. As a result, the height size of the framework 21 can be made small, and thinning, weight reduction, and cost reduction of the product can be achieved.

The configurations of the first embodiment to the seventh embodiment can be implemented by a suitable combination. Further, although the description has been made about the example that screws are used as fastening means in each embodiment, the various fastening means can be also configured by using welding, joining, an adhesive, and the like.

The present invention has been described in detail to a certain extent with reference to the embodiments. However, the details of the disclosed configuration according to the embodiments can be changed, and the combination and order of the elements of each embodiment can be modified without departing from the scope and spirit of the claimed invention.

INDUSTRIAL APPLICABILITY

The induction heating cooking device of the present disclosure can improve easiness of assembling by simplifying the installation configuration of a heating coil unit in a device using one or more heating coil units. Therefore, the induction heating cooking device can be applied stationary type or built-in type induction heating cooking devices that are used in standard home kitchens and business kitchens and in all kinds of heating cooking devices having other heating coil units.

What is claimed is:

1. An induction heating cooking device comprising:
    a top plate on which an object to be heated can be placed;
    a generally box-shaped framework which has a bottom surface of an approximately rectangular shape, side surfaces, and an opening portion of an approximately rectangular shape formed above the bottom surface and which is provided below the top plate; and
    a heating coil unit which is provided inside the framework, and which has
        a heating coil that is capable of induction heating the object to be heated and
        a heating coil supporting member that supports the heating coil, the heating coil supporting member including i) a coil receiving part that defines an outer periphery having substantially the same shape as an outer periphery of the heating coil and ii) coil installation parts provided at the outer periphery of the coil receiving part,
    wherein the heating coil and the heating coil supporting member are provided as part of an integrated unit that forms the heating coil unit,
    wherein at least a first set of opposite side surfaces of the framework are configured to have
        first vertical parts that are formed by being bent upward at outer edge parts of the bottom surface,
        first horizontal parts that are formed by being bent to an outer side at upper edge parts of the first vertical parts, and
        second vertical parts that are formed by being bent upward at outer edge parts of the first horizontal parts,
    wherein the opening portion is formed by upper edge parts of the second vertical parts, and
    wherein the heating coil is disposed entirely between the second vertical parts of the first set of opposite side surfaces and at least one of the coil installation parts of the heating coil supporting member extends over and is fixed to one of the first horizontal parts of the first set of opposite side surfaces.

2. The induction heating cooking device according to claim 1, wherein the first set of opposite side surfaces of the framework are configured to have further second horizontal parts that are formed by being bent to an outer side or an inner side at the upper edge parts of the second vertical parts, and upper surfaces of the second horizontal parts are configured to be in contact with the top plate.

3. The induction heating cooking device according to claim 1,
    wherein a second set of opposite side surfaces of the framework are configured to have first vertical parts that are formed by being bent upward at outer edge parts of the bottom surface, first horizontal parts that are formed by being bent to an outer side at upper edge parts of the first vertical parts, and second vertical parts that are formed by being bent upward at outer edge parts of the first horizontal parts, and
    wherein the induction heating cooking device has a joint member of which both end parts are placed on and fixed to two of the first horizontal parts of the second set of opposite side surfaces that are parallel and face each other in the framework, and
    wherein a first coil installation part of the coil installation parts extends over and is fixed to one of the first horizontal parts of the first set of opposite side surfaces and a second coil installation of the coil installation parts part is fixed to the joint member.

4. The induction heating cooking device according to claim 1, wherein installation positions of the heating coil supporting member are configured to be able to be changed to a front and rear direction or a right and left direction, relative to the first horizontal parts on the first set opposite side surfaces of the framework.

5. The induction heating cooking device according to claim 1, wherein a circuit substrate that drive controls the heating coil is provided below the heating coil supporting member and is configured to be supported by the bottom surface of the framework.

6. The induction heating cooking device according to claim 1, wherein the heating coil supporting member is configured by a non-magnetic metal.

7. An induction heating cooking device comprising:
a top plate on which an object to be heated can be placed;
a generally box-shaped framework which has a bottom surface of an approximately rectangular shape, side surfaces, and an opening portion of an approximately rectangular shape formed above the bottom surface, and which is provided below the top plate;
a heating coil unit which is provided inside the framework, and which has
  a heating coil that is capable of induction heating the object to be heated and
  a heating coil supporting member that supports the heating coil, the heating coil supporting member including i) a coil receiving part that defines an outer periphery having substantially the same shape as an outer periphery of the heating coil and ii) coil installation parts provided at the outer periphery of the coil receiving part; and
a plurality of heating coil unit supporting members that support the heating coil unit and are different from the heating coil supporting member,
wherein the heating coil and the heating coil supporting member are provided as part of an integrated unit that forms the heating coil unit,
wherein at least a first set of opposite side surfaces of the framework are configured to have
  first vertical parts that are formed by being bent upward at outer edge parts of the bottom surface,
  first horizontal parts that are formed by being bent to an outer side at upper edge parts of the first vertical parts, and
  second vertical parts that are formed by being bent upward at outer edge parts of the first horizontal parts,
wherein the opening portion is formed by upper edge parts of the second vertical parts,
wherein the heating coil is disposed entirely between the second vertical parts of the first set of opposite side surfaces and the coil installation parts of the heating coil supporting member are fixed to the plurality of heating coil unit supporting members,
wherein a first heating coil unit supporting member of the plurality of heating coil unit supporting members is fixed to one of the first horizontal parts of the first set of opposite side surfaces.

8. The induction heating cooking device according to claim 7,
wherein a second set of opposite side surfaces of the framework are configured to have first vertical parts that are formed by being bent upward at outer edge parts of the bottom surface, first horizontal parts that are formed by being bent to an outer side at upper edge parts of the first vertical parts, and second vertical parts that are formed by being bent upward at outer edge parts of the first horizontal parts, and
wherein the induction heating cooking device has a joint member of which both end parts are placed on and fixed to two of the first horizontal parts of the second set of opposite side surfaces that are parallel and face each other in the framework,
wherein a second heating coil unit supporting member of the plurality of heating coil unit supporting members is supported by the joint member.

9. The induction heating cooking device according to claim 7, wherein the first heating coil unit supporting member of the plurality of heating coil unit supporting members is provided with a reinforcement longitudinal wall that protrudes downward and that is in contact with an inner surface of one of the first vertical parts of the first set of opposite side surfaces.

* * * * *